US010877251B2

(12) United States Patent
Nakamura et al.

(10) Patent No.: US 10,877,251 B2
(45) Date of Patent: Dec. 29, 2020

(54) IMAGING LENS

(71) Applicant: Sony Corporation, Tokyo (JP)

(72) Inventors: Akira Nakamura, Tokyo (JP); Yoshitomo Onoda, Tokyo (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 15/774,769

(22) PCT Filed: Oct. 7, 2016

(86) PCT No.: PCT/JP2016/079992
§ 371 (c)(1),
(2) Date: May 9, 2018

(87) PCT Pub. No.: WO2017/086050
PCT Pub. Date: May 26, 2017

(65) Prior Publication Data
US 2018/0335613 A1 Nov. 22, 2018

(30) Foreign Application Priority Data

Nov. 20, 2015 (JP) ................................. 2015-227642

(51) Int. Cl.
G02B 13/04 (2006.01)
G02B 13/00 (2006.01)
(Continued)

(52) U.S. Cl.
CPC ............... *G02B 13/04* (2013.01); *G02B 9/62* (2013.01); *G02B 13/0045* (2013.01); *G02B 13/18* (2013.01)

(58) Field of Classification Search
CPC ....... G02B 13/04; G02B 9/62; G02B 13/0045
See application file for complete search history.

(56) References Cited

U.S. PATENT DOCUMENTS 6,339,508 B1 1/2002 Nozawa et al.
2007/0139793 A1 6/2007 Kawada
(Continued)

FOREIGN PATENT DOCUMENTS

CN 201852987 U 6/2011
CN 203630431 U 6/2014
(Continued)

OTHER PUBLICATIONS

International Search Report and English translation thereof dated Nov. 8, 2016 in connection with International Application No. PCT/JP2016/079992.
(Continued)

Primary Examiner — Jack Dinh
(74) Attorney, Agent, or Firm — Wolf, Greenfield & Sacks, P.C.

(57) ABSTRACT

An imaging lens is provided in which a total angle of view is 150 degrees or more, and which exhibits a high-image quality, is compact, is inexpensive, and keeps a stable quality under a harsh environment in an on-board camera or the like.

An imaging lens includes a first lens having a negative refracting power and having a meniscus shape in which a convex surface is directed toward an object side; a second lens having a negative refracting power and having a meniscus shape in which a convex surface is directed toward the object side; a third lens having a positive refracting power and having bi-convex shape; an aperture stop; a fourth lens having a positive refracting power and having a bi-convex shape; a fifth lens having a negative refracting power and having a bi-concave shape; and a sixth lens having a positive refracting power and having a bi-convex shape, the first lens, the second lens, the third lens, the aperture stop, the fourth lens, the fifth lens, and the sixth lens being arranged in order (Continued)

from the object side to an image surface side. Thus, the imaging lens includes six groups and six sheets of independent lenses as a whole, has a total angle of view of 150 degrees or more, and fulfills predetermined conditional expressions.

10 Claims, 8 Drawing Sheets

(51) Int. Cl.
*G02B 9/62* (2006.01)
*G02B 13/18* (2006.01)

(56) References Cited

U.S. PATENT DOCUMENTS

| | | |
|---|---|---|
| 2007/0217035 A1 | 9/2007 | Baba |
| 2008/0074761 A1 | 3/2008 | Yamakawa et al. |
| 2009/0251801 A1 | 10/2009 | Jung et al. |
| 2010/0142062 A1 | 6/2010 | Asami et al. |
| 2012/0026285 A1 | 2/2012 | Yoshida et al. |
| 2014/0126070 A1 | 5/2014 | Ning |
| 2014/0240853 A1 | 8/2014 | Kubota et al. |
| 2015/0062720 A1 | 3/2015 | Lai et al. |
| 2018/0341089 A1 | 11/2018 | Nakamura et al. |

FOREIGN PATENT DOCUMENTS

| | | |
|---|---|---|
| CN | 201438236 U | 4/2020 |
| EP | 1734393 A1 | 12/2006 |
| JP | 2000-292692 A | 10/2000 |
| JP | 2004-029282 A | 1/2004 |
| JP | 2006-349920 A | 12/2006 |
| JP | 2007-164079 A | 6/2007 |
| JP | 2007-249073 A | 9/2007 |
| JP | 2007-279632 A | 10/2007 |
| JP | 2009-063877 A | 3/2009 |
| JP | 2010-243709 A | 10/2010 |
| JP | 2013-003545 A | 1/2013 |
| JP | 2013-073156 A | 4/2013 |
| JP | 2013-073164 A | 4/2013 |
| KR | 2014-0019663 A | 2/2014 |
| WO | WO 2010/113669 A1 | 10/2010 |
| WO | WO 2016/125613 A1 | 8/2016 |

OTHER PUBLICATIONS

Written Opinion and English translation thereof dated Nov. 8, 2016 in connection with International Application No. PCT/JP2016/079992.
International Preliminary Report on Patentability and English translation thereof dated May 31, 2018 in connection with International Application No. PCT/JP2016/079992.
Extended European Search Report dated May 28, 2019 in connection with European Application No. 16866052.0.
International Search Report and English translation thereof dated Nov. 8, 2016 in connection with International Application No. PCT/JP2016/079993.
Written Opinion and English translation thereof mailed Nov. 8, 2016 in connection with International Application No. PCT/JP2016/079993. Y.
International Preliminary Report on Patentability and English translation thereof dated May 31, 2018 in connection with International Application No. PCT/JP2016/079993.
Extended European Search Report dated Feb. 19, 2019 in connection with European Application No. 16866053.8.
Partial European Search Report dated Feb. 19, 2019 in connection with European Application No. 16866052.0.
Gross et al., Handbook of Optical Systems, vol. 3: Aberration Theory and Correction of Optical Systems, Jan. 1, 2007, Wiley-VCH, Weinheim, DE, XP055258161, pp. 377-379.
Chinese Office Action dated Mar. 30, 2020 in connection with Chinese Application No. 201680066178.3 and English translation thereof.

IMAGING LENS

CROSS REFERENCE TO RELATED APPLICATIONS

This is a U.S. National Stage Application under 35 U.S.C. § 371, based on International Application No. PCT/JP2016/079992, filed Oct. 7, 2016, which claims priority to Japanese Patent Application JP 2015-227642, filed Nov. 20, 2015, each of which is hereby incorporated by reference in its entirety.

TECHNICAL FIELD

The present technique relates to a technical field of an imaging lens which, for example, is suitable for an on-board camera, a monitoring camera, a camera for a portable apparatus and the like.

CITATION LIST

Patent Literature

[PTL 1]
JP 2009-63877A
[PTL 2]
JP 2013-3545A
[PTL 3]
JP 2013-73156A

BACKGROUND ART

In recent years, image pickup devices for an on-board camera, a monitoring camera, a camera for a portable apparatus, and the like have become popular. For these image pickup devices, along with miniaturization and high-pixelization of an image pickup element, represented by a CCD or a CMOS, which captures an image formed by an imaging lens, it is required for the imaging lens to realize the miniaturization, the low cost, and the satisfactory peripheral resolution performance while ensuring the wide angle of view. The imaging lens fulfilling such requests, for example, include ones described in PTL 1 to PTL 3.

SUMMARY

Technical Problems

PTL 1 proposes an imaging lens which is configured by four groups and five sheets of lenses, and in which a chromatic aberration is suppressed by cement of a fourth lens including a plastic, and a fifth lens including a plastic, and a total angle of view exceeds 180 degrees. However, the cement between the plastic lenses includes a risk in which it is necessary to use an adhesive agent and to carry out processes for the cement, and moreover a shape of a cemented surface is changed along with a temperature change, so that the lenses cemented become easy to peel off.

PTL 2 proposes an imaging lens which is configured by five group and five sheets of lenses, and in which a total angle of view exceeds 180 degrees. However, the imaging lens has a configuration in which the rear group is separated into two sheets of positive and negative lenses, and thus the chromatic aberration is too much to correct, and it is difficult to obtain the satisfactory resolution performance up to the periphery.

PTL 3 is disclosed as a document in which the problems involved in the two documents described above are solved. PTL 3 proposes an imaging lens which is configured by six groups and six sheets of lenses, and in which a negative power, a negative power, a positive power, a positive power, a negative power, and a positive power are arranged in terms of power arrangement from an object side, and a total angle of view exceeds 180 degrees. However, in each of Examples, each of a first lens, a fourth lens, and a fifth lens includes a glass material. Moreover, a relative expensive glass material is used in which of the constituent lenses, in the first lens having the largest volume and the largest lens effective surface, a refractive index Nd on a d-line=1.7725, and an Abbe's number vd=49.6. As a result, the imaging lens becomes an expensive imaging lens.

Therefore, the development of the imaging lens is desired in which the total angle of view is as wide as 150 degrees or more, and which exhibits a high-image quality, is compact, is inexpensive, and keeps a stable quality under a harsh environment in an on-board camera or the like.

In the light of the foregoing, an object of an imaging lens of the present technique is to provide an imaging lens in which the total angle of view is 150 degrees, and which exhibits a high-image quality, is compact, is inexpensive, and keeps a stable quality under a harsh environment in an on-board camera or the like.

Solution to Problems

A first imaging lens according to the present technique includes a first lens, a second lens, a third lens, an aperture stop, a fourth lens, a fifth lens, and a sixth lens which are arranged in order from an object side toward an image surface side, and is configured by six groups and six sheets of independent lenses as a whole. In this case, the first lens has a negative refracting power, and has a meniscus shape in which a convex surface is directed toward the object side. The second lens has a negative refracting power, and has a meniscus shape in which a convex surface is directed toward the object side. The third lens has a positive refracting power and has a bi-convex shape. The fourth lens has a positive refracting power and has a bi-convex shape. The fifth lens has a negative refracting power and has a bi-concave shape. The sixth lens has a positive refracting power and a bi-convex shape. In addition, a total angle of view is to 150 degrees or more, and a following conditional expression (1) is fulfilled.

$$40 < R5/f \qquad (1)$$

where
R5: a radius of curvature on an optical axis of a surface on the object side of the third lens
f: a focal length of an entire system A second imaging lens according to the present technique includes a first lens, a second lens, a third lens, an aperture stop, a fourth lens, a fifth lens, and a sixth lens which are arranged in order from an object side to an image surface side, and is configured by six groups and six sheets of independent lenses as a whole. In this case, the first lens has a negative refracting power, and has a meniscus shape in which a convex surface is directed toward the object side. The second lens has a negative refracting power, and has a meniscus shape in which a convex surface is directed toward the object side. The third lens has a positive refracting power and has a bi-convex shape. The fourth lens has a positive refracting power and has a bi-convex shape. The fifth lens has a negative refracting power and has a bi-concave shape.

The sixth lens has a positive refracting power and a bi-convex shape. In addition, a total angle of view is set to 150 degrees or more, and a following conditional expression (6) is fulfilled.

$$R5/R6<-10 \qquad (6)$$

where

R5: a radius of curvature on an optical axis of a surface on the object side of the third lens R6: a radius of curvature on the optical axis of a surface on the image side of the third lens A third imaging lens according to the present technique includes a first lens, a second lens, a third lens, an aperture stop, a fourth lens, a fifth lens, and a sixth lens which are arranged in order from an object side toward an image surface side, and is configured by six groups and six sheets of independent lenses as a whole. In this case, the first lens has a negative refracting power, and has a meniscus shape in which a convex surface is directed toward the object side. The second lens has a negative refracting power, and has a meniscus shape in which a convex surface is directed toward the object side. The third lens has a positive refracting power and has a bi-convex shape. The fourth lens has a positive refracting power and has a bi-convex shape. The fifth lens has a negative refracting power and has a bi-concave shape. The sixth lens has a positive refracting power and a bi-convex shape. In addition, a total angle of view is set to 150 degrees or more, and a following conditional expression (7) is fulfilled.

$$34<R3/f \qquad (7)$$

where

R3: a radius of curvature on an optical axis of a surface on the object side of the second lens f: a focal length of an entire system A fourth imaging lens according to the present technique includes a first lens, a second lens, a third lens, an aperture stop, a fourth lens, a fifth lens, and a sixth lens which are arranged in order from an object side toward an image surface side, and is configured by six groups and six sheets of independent lenses as a whole. In this case, the first lens has a negative refracting power, and has a meniscus shape in which a convex surface is directed toward the object side. The second lens has a negative refracting power, and has a meniscus shape in which a convex surface is directed toward the object side. The third lens has a positive refracting power and has a bi-convex shape. The fourth lens has a positive refracting power and has a bi-convex shape. The fifth lens has a negative refracting power and has a bi-concave shape. The sixth lens has a positive refracting power and a bi-convex shape. In addition, a total angle of view is set to 150 degrees or more, and a following conditional expression (8) is fulfilled.

$$30.5<R3/R4 \qquad (8)$$

where

R3: a radius of curvature on an optical axis of a surface on the object side of the second lens R4: a radius of curvature on the optical axis of a surface on the image side of the second lens A fifth imaging lens according to the present technique includes a first lens, a second lens, a third lens, an aperture stop, a fourth lens, a fifth lens, and a sixth lens which are arranged in order from an object side toward an image surface side, and is configured by six groups and six sheets of independent lenses as a whole. In this case, the first lens has a negative refracting power, and has a meniscus shape in which a convex surface is directed toward the object side. The second lens has a negative refracting power, and has a meniscus shape in which a convex surface is directed toward the object side. The third lens has a positive refracting power and has a bi-convex shape. The fourth lens has a positive refracting power and has a bi-convex shape. The fifth lens has a negative refracting power and has a bi-concave shape. The sixth lens has a positive refracting power and a bi-convex shape. In addition, a total angle of view is set to 150 degrees or more, and a following conditional expression (9) is fulfilled.

$$0.8<(R5+R6)/(R5-R6)<1 \qquad (9)$$

where

R5: a radius of curvature on an optical axis of a surface on the object side of the third lens R6: a radius of curvature on the optical axis of a surface on the image side of the third lens In each of the first imaging lens to the fifth imaging lens according to the present technique, it is possible to provide the imaging lens in which the total angle of view is as wide as 150 degrees or more, and which exhibits a high-image quality, is compact, is inexpensive, and keeps a stable quality under a harsh environment in an on-board camera or the like.

In addition, in the imaging lens according to the present technique, at least one conditional expression of following conditional expression (2), conditional expression (3), conditional expression (4), and conditional expression (5) is desirably fulfilled. In terms of the form, a single form or a combination form may be available.

$$1.5<f6/f<2.05 \qquad (2)$$

$$-0.6<R4/f2<-0.52 \qquad (3)$$

$$-5.5<f123/f456<-1.35 \qquad (4)$$

$$1<(R3+R4)/(R3-R4)<1.067 \qquad (5)$$

where f6: the focal length of the sixth lens f: the focal length of the entire system R4: the radius of curvature on the optical axis of the surface on the image side of the second lens f2: the focal length of the second lens f123: a synthetic focal length of the first lens, the second lens, and the third lens f456: a synthetic focal length of the fourth lens, the fifth lens, and the sixth lens R3: the radius of curvature on the optical axis of the surface on the object side of the second lens Advantageous Effect of Invention According to the present technique, in the lens configuration of the six groups and six sheets of lenses, by setting the shapes and the powers of the each lenses to the preferred forms, it is possible to obtain the imaging lens in which a total angle of view is as wide as 150 degrees or more, and which exhibits a high-image quality, is compact, is inexpensive, and keeps a stable quality under a harsh environment in an on-board camera or the like.

It should be noted that the effects described in the present description are merely exemplifications and are by no means limited, and other effects may be offered.

DESCRIPTION OF EMBODIMENT

[Imaging Lens According to Embodiment of the Present Technique]

Hereinafter, an image lens according to an embodiment of the present technique will be described with reference to the drawings. It should be noted that in the present technique, a lens shape such as a convex surface or a concave surface, and a sign of a refracting power such as a positive refracting power or a negative refracting power are defined in a paraxial area. In addition, a curvature radius is also defined in the paraxial area. Thus, with respect to polarity, a surface of convex on an object side is defined as being positive and a surface of convex on an image side is defined as being negative. Moreover, a focal length of each lens, synthesis, and an entire system is defined with a value in 587.56 nm of a d-line as a wavelength.

Figure 1:
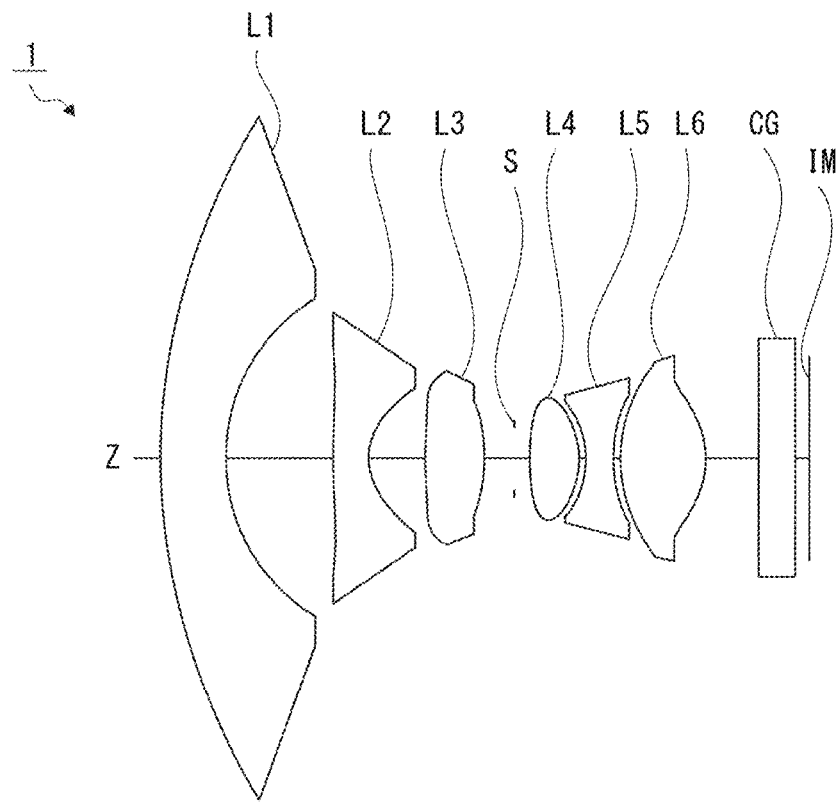
FIG. 1 is a cross-sectional view depicting First Configuration Example of an imaging lens according to an embodiment of the present technique.
Figure 2:
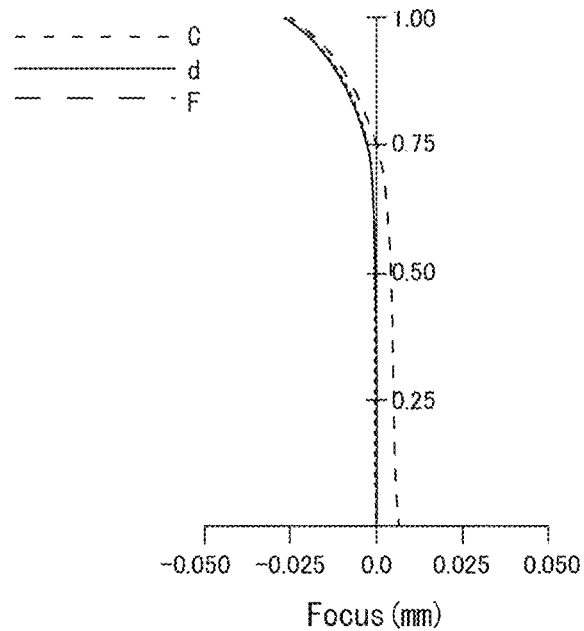
FIG. 2 is an aberration view depicting aberrations in Numerical Example 1 in which concrete numerical values are applied to the imaging lens depicted in FIG. 1.
Figure 2:
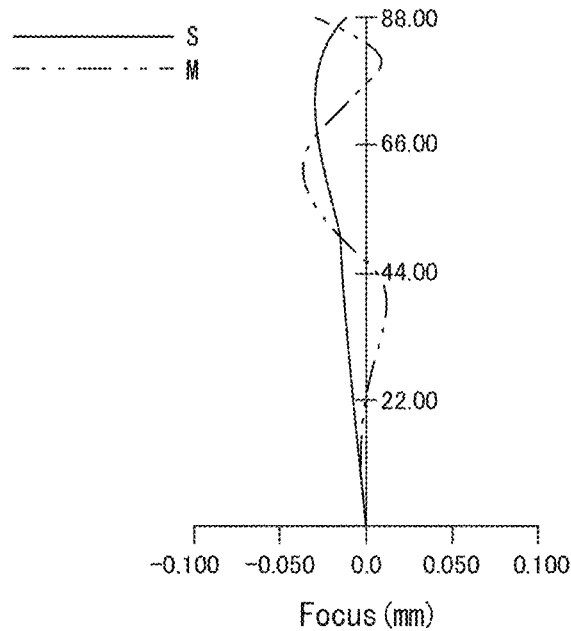

FIG. 1 is a cross sectional view depicting a numerical example of an imaging lens according to an embodiment of the present technique. Since each of imaging lenses of Example 2 to Example 7 which will be described later also has the same basic configuration as that of Example 1 depicted in FIG. 1 and is also identical in illustrated method to that of Example 1 depicted in FIG. 1, in this case, the imaging lens according to the embodiment of the present technique will be described with reference to FIG. 1.

In FIG. 1, the left side is set as an object side and the right side is set as an image side, and an optical axis is expressed by Z.

The imaging lens (imaging lens 1 to imaging lens 7) according to the embodiment of the present technique is a lens having a lens configuration of six groups and six sheets of lenses in which a first lens L1, a second lens L2, a third lens L3, a fourth lens L4, a fifth lens L5, and a sixth lens L6 are arranged in order from the object side to the image side independently of one another along the optical axis Z. An aperture stop S is arranged between the third lens L3 and the fourth lens L4. By arranging the aperture stop S between the third lens L3 and the fourth lens L4, the miniaturization in the radial direction can be realized and at the same time, a chromatic aberration of magnification can be suppressed.

In FIG. 1, an image surface IM of the imaging lens is also illustrated in consideration of the case where the imaging lens is applied to an image pickup apparatus. In addition, a parallel plate CG for which a cover glass and a low-pass filter necessary when the imaging lens is applied to the image pickup apparatus are supposed is arranged between the sixth lens L6 of the imaging lens, and the image surface IM.

The first lens L1 has a negative refracting power and is formed in a meniscus shape in which a convex surface is directed toward the object side. The first lens L1 is configured in such a manner, so that the first lens L1 becomes advantageous in wide angle and correction of distortion. In addition, in the example, the first lens L1 includes a glass lens. The reason for this is because especially, if the on-board use application is taken into consideration, the weatherability, the impact resistance, the wear resistance, and the like are required for the first lens L1. In addition, the reason why both surfaces of the first lens L1 are formed as spherical surfaces is because it is feared that if the glass as the material is formed as a spherical surface, the cost is increased although the first lens L1 includes a glass and is formed to have the aspherical surface. However, even if the glass is formed as the aspherical surface, there is no problem in terms of design performance.

The second lens L2 has a negative refracting power and is formed in a meniscus shape in which a convex surface is directed toward the object side. By arranging two sheets of lenses each having the negative refracting power on the object side, the two sheets of lenses can take charge of part of the large negative power. In addition, by forming the surface of the second lens L2 on the object side in the form of the convex surface, incident light ray from a wide angle of view can be folded at a shallow angle in a step-by-step manner through the four surfaces of the first lens L1 and the second lens L2, thereby making easy the wide angle and the correction of the distortion.

The third lens L3 is formed so as to have the positive refracting power and the bi-convex shape. By arranging the lens having the positive power on the object side of the aperture stop S, the chromatic aberration of magnification, and the curvature of field becomes easy to correct.

In addition, the aperture stop S is arranged between the third lens L3 and the fourth lens L4, thereby making easy the miniaturization in the radial direction of the wide angle imaging lens.

The fourth lens L4 having the positive refracting power and the bi-convex shape, the fifth lens L5 having the negative refracting force and the bi-concave shape, and the sixth lens L6 having the positive refracting power and the bi-convex shape are arranged on the image side of the aperture stop S. By adopting such a triplet configuration, the aberrations exerting an influence on the imaging performance is easy to correct.

In particular, the sixth lens L6 having the positive refracting power is arranged closest to the image side in the imaging lens, whereby the correction of the intervals with the image surface as the imaging surface and an incidence angle of off-axis rays to the image surface, that is, the correction of the back focus and shading is easy to carry out.

The imaging lens of the present technique fulfills at least one of the conditional expression (1), the conditional expression (6), the conditional expression (7), the conditional expression (8), and the conditional expression (9).

$$40 < R5/f \tag{1}$$

$$R5/R6 < -10 \tag{6}$$

$$34 < R3/f \tag{7}$$

$$30.5 < R3/R4 \tag{8}$$

$$0.8 < (R5+R6)/(R5-R6) < 1 \tag{9}$$

where

R5: the radius of curvature on the optical axis of the surface on the object side of the third lens f: the focal length of the entire system R6: the radius of curvature on the optical axis of the surface on the image side of the third lens R3: the radius of curvature on the optical axis of the surface on the object side of the second lens R4: the radius of curvature on the optical axis of the surface on the image side of the second lens The conditional expression (1) is an expression for regulating a ratio of the radius of curvature on the optical axis of the surface on the object side of the third lens L3 to the focal length of the imaging lens. The expression means that the surface on the object side of the third lens L3 is convex on the object side. When the ratio falls below the lower limit as the numerical value, the radius of curvature of the surface on the object side of the third lens L3 becomes small, the positive refracting power of the surface on the object side of the third lens L3 becomes strong, and thus the curvature of field becomes difficult to correct.

The conditional expression (6) is an expression for regulating a ratio of the radius of curvature on the optical axis of the surface on the object side of the third lens L3 to the radius of curvature on the optical axis of the surface on the image side of the third lens L3. When the ratio exceeds the upper limit as the numerical value, the curvature of field or the chromatic aberration of magnification becomes difficult to correct.

The conditional expression (7) is an expression for regulating a ratio of the radius of curvature on the optical axis of the surface on the object side of the second lens L2 to the focal length of imaging lens. The expression means that the surface on the object side of the second lens L2 is convex on the object side. When the ratio falls below the lower limit as the numerical value, the radius of curvature on the optical axis of the surface on the object side of the second lens L2 becomes small, the negative refracting power of the second lens L2 becomes weak, and thus the wide angle becomes difficult to attain.

The conditional expression (8) is an expression for regulating a ratio of the radius of curvature on the optical axis of the surface on the object side of the second lens L2 to the radius of curvature on the optical axis of the surface on the image side of the second lens L2. Although the expression means that the second lens L2 is formed in the form of the meniscus shape, in terms of the configuration, the second lens L2 is formed in the form of the meniscus shape which is convex on the object side. When the ratio falls below the lower limit as the numerical value, the refracting power of the second lens L2 becomes weak. In addition, the radius of curvature on the optical axis of the surface on the object side of the second lens L2 becomes small, and also the radius of curvature on the optical axis of the surface on the image side of the second lens L2 becomes large. As a result, the wide angle, or the correction of the curvature of field becomes difficult to carry out.

The conditional expression (9) is an expression for regulating a ratio of a sum to a difference between the radius of curvature on the optical axis of the surface on the object side of the third lens L3 and the radius of curvature on the optical axis of the surface on the image side of the third lens L3. In terms of the configuration, the third lens L3 is formed in the form of the bi-convex shape. Therefore, the expression means that the absolute value of the radius of curvature on the optical axis of the surface on the object side of the third lens L3 is large, and the absolute value of the radius of curvature on the optical axis of the surface on the image side of the third lens L3 is small. Thus, in the bi-convex shape, the ratio never exceeds the upper limit as the numerical value. When the ratio falls below the lower limit as the numerical value, the curvature of field, or the chromatic aberration of magnification becomes difficult to correct.

Incidentally, the imaging lens of the present technique may be configured to fulfill a conditional expression (1-1), a conditional expression (6-1), a conditional expression (7-1), and a conditional expression (9-1) instead of fulfilling the conditional expression (1), the conditional expression (6), the conditional expression (7), and the conditional expression (9), respectively.

$$50 < R5/f \tag{1-1}$$

$$R5/R6 < -12.5 \tag{6-1}$$

$$37 < R3/f \tag{7-1}$$

$$0.85 < (R5+R6)/(R5-R6) < 1 \tag{9-1}$$

where

R5: the radius of curvature on the optical axis of the surface on the object side of the third lens f: the focal length of the entire system R6: the radius of curvature on the optical axis of the surface on the image side of the third lens R3: the radius of curvature on the optical axis of the surface on the object side of the second lens In each of the imaging lens 1 to the imaging lens 7 according to the present technique, it is possible to provide the imaging lens in which the total angle of view is as wide as 150 degrees or more, and which exhibits the high-image quality, is compact, is inexpensive, and keeps the stable quality under the harsh environment in the on-board camera or the like.

In addition, the imaging lens according to the present technique desirably fulfills at least one conditional expression of the following a conditional expression (2), a conditional expression (3), a conditional expression (4), and a conditional expression (5). In terms of the form, any of the single conditional expression or a combination of the conditional expressions may be available.

$$1.5 < f6/f < 2.05 \tag{2}$$

$$-0.6 < R4/f2 < -0.52 \tag{3}$$

$$-5.5<f123/f456<-1.35 \quad (4)$$

$$1<(R3+R4)/(R3-R4)<1.067 \quad (5)$$

where
f6: the focal length of the sixth lens
f: the focal length of the entire system
R4: the radius of curvature on the optical axis of the surface on the image side of the second lens
f2: the focal length of the second lens
f123: a synthetic focal length of the first lens, the second lens, and the third lens
f456: a synthetic focal length of the fourth lens, the fifth lens, and the sixth lens
R3: the radius of curvature on the optical axis of the surface on the object side of the second lens The conditional expression (2) is an expression for regulating a ratio of the focal length of the sixth lens L6 to the focal length of the entire system of the imaging lens. The expression means that the sixth lens has the positive refracting power. If the ratio falls below the lower limit as the numerical value, the refracting power of the sixth lens L6 becomes strong, and thus the back focus becomes difficult to secure in terms of the imaging lens, which interferes with the arrangement of the filter and the like, and the image surface at the time of the assembly, that is, the focus adjustment of the image pickup element represented by a CCD or a CMOS. If the ratio exceeds the upper limit as the numerical value, the refracting power of the sixth lens L6 becomes weak, the back focus becomes long, and the entire length also becomes long in terms of the imaging lens, which interferes with the increase in size.

The conditional expression (3) is an expression for regulating a ratio of the radius of curvature on the optical axis of the surface on the image side of the second lens L2 to the focal length of the second lens L2. The expression means that since the refracting power of the second lens L2 is negative, the radius of curvature on the optical axis of the surface on the image side of the second lens L2 is concave on the image side. When the ratio falls below the lower limit as the numerical value, the radius of curvature on the optical axis of the surface on the image side of the second lens L2 becomes large. As a result, the wide angle, and the correction of curvature of field become difficult to carry out. On the other hand, when the ratio exceeds the upper limit as the numerical value, the radius of curvature on the optical axis of the surface on the image side of the second lens L2 becomes small. Thus, in the case where it is supposed that the second lens L2 includes the plastic material, the inspection management of the die machining for the molding, the molding, and the die and the molded article becomes difficult to carry out.

The conditional expression (4) is an expression for regulating a ratio of the synthetic focal length of the first lens L1, the second lens L2, and the third lens L3 which are arranged on the object side of the aperture stop S to the synthetic focal length of the fourth lens L4, the fifth lens L5, and the sixth lens L6 which are arranged on the image side of the aperture stop S. The expression means that the imaging lens is of a so-called retrofocus type in which the negative refracting power is arranged on the object side of the aperture stop S, and the positive refracting power is arranged on the image side of the aperture stop S. When the ratio falls below the lower limit as the numerical value, a negative refracting power as a reciprocal number of the synthetic focal length of the first lens L1, the second lens L2, and the third lens L3 becomes weaker than a positive refracting power as a reciprocal number of the synthetic focal length of the fourth lens L4, the fifth lens L5, and the sixth lens L6. From a viewpoint of a retro ratio, in this case, the back focus becomes difficult to secure in terms of the imaging lens, which interferes with the arrangement of the filter and the like, and the image surface at the time of the assembly, that is, the focus adjustment of the image pickup element represented by a CCD or a CMOS. In addition, in the case where each of the negative refracting powers of the first lens L1 and the second lens L2 is weak, the wide angle becomes difficult to attain, which causes the enlargement of the first lens L1 in the radial direction. On the other hand, when the ratio exceeds the upper limit as the numerical value, the back focus becomes long, and the total length also becomes long in terms of the imaging lens. As a result, there is a trouble of causing an increase in size. On the other hand, in the case where each of the negative refracting powers of the first lens L1 and the second lens L2 is strong, the off-axis aberration, including the distortion becomes difficult to correct.

The conditional expression (5) is an expression for regulating a ratio of a sum to a difference between the radius of curvature on the optical axis of the surface on the object side of the second lens L2 and the radius of curvature on the optical axis of the surface on the image side of the second lens L2. In terms of the configuration, the second lens L2 includes the form of the meniscus shape which is convex on the object side. Therefore, the expression means that the radius of curvature on the optical axis of the surface on the object side of the second lens L2 is large, and the radius of curvature on the optical axis of the surface on the image side of the second lens L2 is small. Thus, in the negative meniscus shape, the ratio never exceeds the lower limit as the numerical value. When the ratio exceeds the upper limit as the numerical value, the value of the radius of curvature on the optical axis of the surface on the object side of the second lens L2, and the value of the radius of curvature on the optical axis of the surface on the image side of the second lens L2 become close to each other, that is, the negative refracting power of the second lens L2 becomes weak. In this case, the wide angle, or the correction of the curvature of field becomes difficult to carry out.

Incidentally, the imaging lens of the present technique may be configured to fulfill a conditional expression (2-1), a conditional expression (3-1), and a conditional expression (4-1) instead of fulfilling the conditional expression (2), the conditional expression (3), and the conditional expression (4), respectively.

$$1.7<f6/f<2.05 \quad (2-1)$$

$$-0.55<R4/f2<-0.52 \quad (3-1)$$

$$-5.1<f123/f456\leq-1.4 \quad (4-1)$$

where
f6: the focal length of the sixth lens
f: the focal length of the entire system
R4: the radius of curvature on the optical axis of the surface on the image side of the second lens
f2: the focal length of the second lens
f123: the synthetic focal length of the first lens, the second lens, and the third lens
f456: the synthetic focal length of the fourth lens, the fifth lens, and the sixth lens

[Numerical Examples of Imaging Lens]

A description will now be given with respect to concrete Numerical Examples of the imaging lens according to the present embodiment. In this case, a description will now be given with respect to Numerical Examples in which concrete numerical values are applied to an imaging lens 1 to the imaging lens 7 of each Configuration Examples depicted in FIG. 1, FIG. 3, FIG. 5, FIG. 7, FIG. 9, FIG. 11, and FIG. 13, respectively.

The meanings or the like of reference symbols depicted in following TABLES and descriptions are as follows. "surface number" exhibits a number of an i-th surface counted from the object side to the image side. "Ri" exhibits a value (mm) of a curvature radius of a near axis of the i-th surface, that is, a value of a curvature radius on an optical axis. "Di" exhibits a value (mm) of an axial distance (lens center thickness or air interval) between an i-th surface and an (i+1)-th surface. "Ndi" exhibits a value of a refractive index in a d-line (having a wavelength of 587.56 (nm)) of a material of a lens or the like starting from the i-th surface. "vdi" exhibits a value of an Abbe's number in the d-line of the material of the lens or the like starting from the i-th surface. A portion in which a value of "Ri" is expressed by "∞" exhibits a flat surface or a stop surface (aperture stop S). A surface in which "stop" is described in "surface number" exhibits an aperture stop S.

In some lenses used in Numerical Examples, the lens surface is formed in the form of an aspherical surface. In "surface number," a surface having "*" added thereto exhibits the aspherical surface. The aspherical surface shape is defined by the following expression. In each of TABLES depicting aspherical surface coefficients, "E-n" is an exponential expression with 10 as a base, that is, expresses "10 to the minus n-th power." For example, "1.2345E-05" expresses "1.2345×(10 to the minus fifth power)."

The shape of the aspherical surface is expressed by the following expression.

$$Z=[(Y^2/R)/[1+SQRT\{1-(1+K)*(Y/R)^2\}]+AA*Y^4+AB*Y^6+AC*Y^8+AD*Y^{10}+AE*Y^{12}$$

In the above aspherical surface expression, a distance in an optical axis direction from a vertex of a lens surface is assigned "Z," and with regard to the polarity, the image surface side is set positive. A height in a direction vertical to the optical axis is assigned "Y," the curvature radius on the optical axis of the surface is assigned R, and a conic constant is assigned "K." "AA," "AB," "AC," "AD," and "AE" exhibit fourth-order, sixth-order, eighth-order, tenth-order, twelfth-order aspherical surface coefficients, respectively.

Each of the imaging lens 1 to the imaging lens 7 to which following Numerical Examples are applied has a total angle of view of 176 degrees or more, and is constituted by a first lens L1, a second lens L2, a third lens L3, an aperture stop S, a fourth lens L4, a fifth lens L5, and a sixth lens L6 which are arranged in order from an object side to an image surface side. In this case, the first lens L1 has a negative refracting power and has a meniscus shape in which a convex surface is directed toward the object side. The second lens L2 has a negative refracting power and has a meniscus shape in which a convex surface is directed toward the object side. The third lens L3 has a positive refracting power and has a bi-convex shape. The fourth lens L4 has a positive refracting power and has a bi-convex shape. The fifth lens L5 has the negative refracting power and has a bi-concave shape. In addition, the sixth lens L6 has the positive refracting power and has a bi-convex shape. With the lens configuration, the incident light is transmitted through a parallel plate CG to be imaged on an image surface IM. The first lens L1 includes a glass and both surfaces thereof are formed in the form of spherical surfaces. Each of the second lens L2 to the sixth lens L6 includes a plastic, and both the surfaces thereof are formed in the form of aspherical surfaces. In addition, the image surface position is set in such a way that the image is in focus when an object point is arranged in a position 400 mm away from the vertex of the surface on the object side of the first lens L1. Although the distortion characteristics are not depicted in the aberrations in the figures, any of Numerical Examples adopts an equidistant projection method. In some Numerical Examples, increase and decrease of the magnification for a specific angle of view are taken into account.

The lens data of Numerical Example 1 in the imaging lens 1 depicted in FIG. 1 is depicted in TABLE 1-1, and the aspherical data thereof is depicted in TABLE 1-2. The total angle of view is 176 degrees, the F-value is 2.03, and the focal length f of the entire system of the imaging lens is 1.027 mm.

TABLE 1-1

| surface number | Ri | Di | Ndi | ν di |
|---|---|---|---|---|
| 1 | 12.230 | 1.300 | 1.589 | 61.3 |
| 2 | 3.650 | 2.150 | | |
| 3* | 1273.127 | 0.700 | 1.544 | 55.5 |
| 4* | 1.296 | 1.194 | | |
| 5* | 170.395 | 1.100 | 1.64 | 23.5 |
| 6* | −3.358 | 0.600 | | |
| stop | ∞ | 0.300 | | |
| 8* | 3.317 | 1.000 | 1.544 | 55.5 |
| 9* | −1.215 | 0.100 | | |
| 10* | −1.763 | 0.600 | 1.64 | 23.5 |
| 11* | 2.057 | 0.100 | | |
| 12* | 2.683 | 1.720 | 1.544 | 55.5 |
| 13* | −1.390 | 1.039 | | |
| 14 | ∞ | 0.700 | 1.5168 | 64.2 |
| 15 | ∞ | 0.300 | | |
| IM | ∞ | 0.000 | | |

TABLE 1-2

| aspherical surface | Ki | AAi | ABi | ACi | ADi | AEi |
|---|---|---|---|---|---|---|
| 3 | 0 | 3.9846E−02 | −1.7346E−02 | 2.6656E−03 | −1.4371E−04 | 0 |
| 4 | −0.35527 | 3.8726E−02 | 4.9947E−02 | −8.4321E−02 | 2.1002E−02 | 0 |
| 5 | 0 | 2.0530E−02 | 2.7199E−03 | −2.0777E−02 | 8.3617E−03 | 0 |
| 6 | 0 | 2.3762E−02 | −7.8308E−03 | −3.3423E−03 | 4.1325E−03 | 0 |
| 8 | 0 | 3.7575E−02 | −2.8408E−02 | 8.9250E−03 | −7.5764E−03 | 0 |
| 9 | 0 | 1.6221E−01 | −4.9543E−05 | 7.3798E−02 | 7.1507E−02 | 0 |
| 10 | 0 | −7.5154E−02 | 1.0022E−01 | −1.0018E−01 | 6.0407E−02 | 0 |
| 11 | 0 | −1.4508E−01 | 9.0501E−02 | −3.5652E−02 | 6.3188E−03 | 0 |
| 12 | 0 | −2.1899E−02 | 3.2373E−03 | 6.3443E−04 | −1.5993E−04 | 0 |
| 13 | −0.44639 | 6.2472E−02 | 5.0954E−03 | 2.4616E−03 | −1.3455E−03 | 4.5904E−04 |

Figure 3:
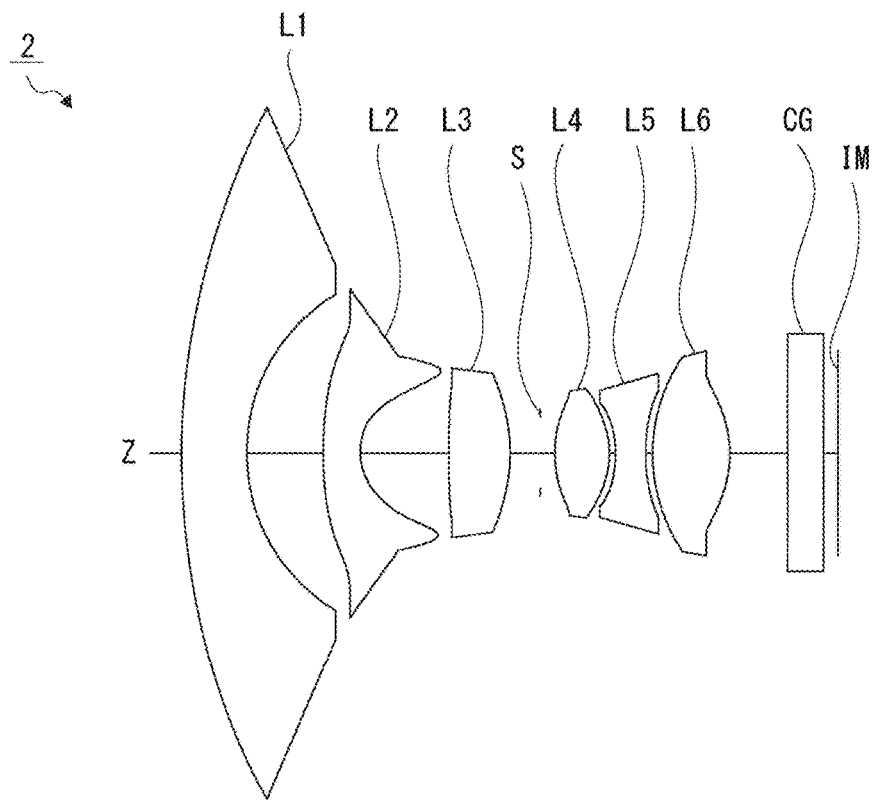
FIG. 3 is a cross-sectional view depicting Second Configuration Example of the imaging lens.
Figure 4:
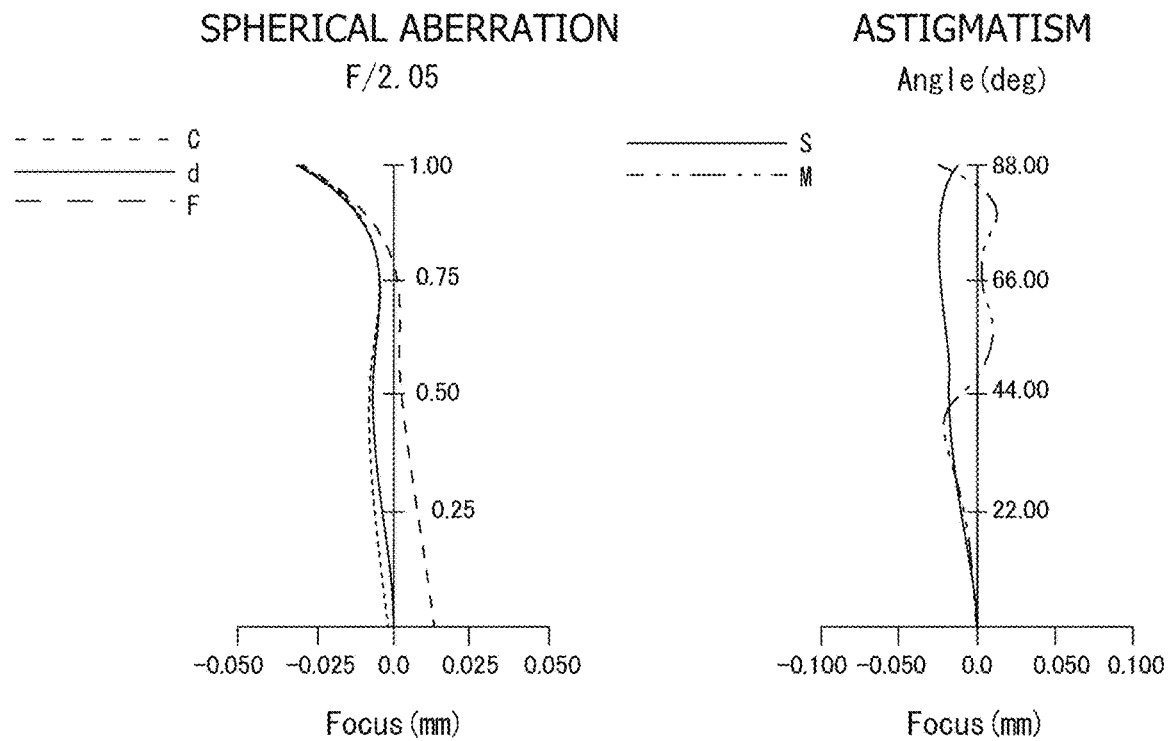
FIG. 4 is an aberration view depicting aberrations in Numerical Example 2 in which concrete numerical values are applied to the imaging lens depicted in FIG. 3.

The lens data of Numerical Example 2 in the imaging lens 2 depicted in FIG. 3 is depicted in TABLE 2-1, and the aspherical surface data is depicted in TABLE 2-2. The total angle of view is 176 degrees, the F-value is 2.05, and the focal length f of the entire system of the imaging lens is 1.043 mm.

TABLE 2-1

| surface number | Ri | Di | Ndi | ν di |
|---|---|---|---|---|
| 1 | 14.333 | 1.300 | 1.589 | 61.3 |
| 2 | 3.500 | 1.506 | | |
| 3* | 788.466 | 0.750 | 1.544 | 55.5 |
| 4* | 1.353 | 1.823 | | |
| 5* | 631.848 | 1.100 | 1.64 | 23.5 |
| 6* | −3.925 | 0.600 | | |
| stop | ∞ | 0.300 | | |
| 8* | 2.618 | 1.074 | 1.544 | 55.5 |
| 9* | −1.287 | 0.100 | | |
| 10* | −1.594 | 0.600 | 1.64 | 23.5 |
| 11* | 2.040 | 0.102 | | |
| 12* | 2.138 | 1.531 | 1.544 | 55.5 |
| 13* | −1.829 | 1.112 | | |
| 14 | ∞ | 0.700 | 1.5168 | 64.2 |
| 15 | ∞ | 0.300 | | |
| IM | ∞ | 0.000 | | |

TABLE 2-2

| aspherical surface | Ki | AAi | ABi | ACi | ADi | AEi |
|---|---|---|---|---|---|---|
| 3 | 0 | 5.7087E−02 | −1.2503E−02 | 1.0475E−03 | −3.1371E−05 | 0 |
| 4 | −0.648534 | 9.6240E−02 | 5.3265E−02 | −1.7074E−02 | 3.5952E−03 | 0 |
| 5 | 0 | 6.1131E−03 | −3.4309E−03 | 5.5502E−04 | −2.3927E−03 | 0 |
| 6 | 0 | −1.0565E−03 | −1.1826E−03 | −4.5452E−03 | 1.6221E−03 | 0 |
| 8 | 0 | 1.7645E−02 | −2.6672E−02 | 1.9276E−02 | −1.2335E−02 | 0 |
| 9 | 0 | 1.5236E−01 | −1.1611E−02 | −5.4865E−02 | 4.8430E−02 | 0 |
| 10 | 0 | −2.3043E−02 | 8.5398E−02 | −9.9330E−02 | 5.5748E−02 | 0 |
| 11 | 0 | −1.5042E−01 | 8.1235E−02 | −2.8047E−02 | 4.6201E−03 | 0 |
| 12 | 0 | −5.8688E−02 | 7.4576E−03 | 1.5404E−03 | −6.7885E−04 | 0 |
| 13 | 0 | 4.9034E−02 | 1.6392E−02 | −8.4277E−03 | 2.0683E−03 | 2.9353E−05 |

Figure 5:
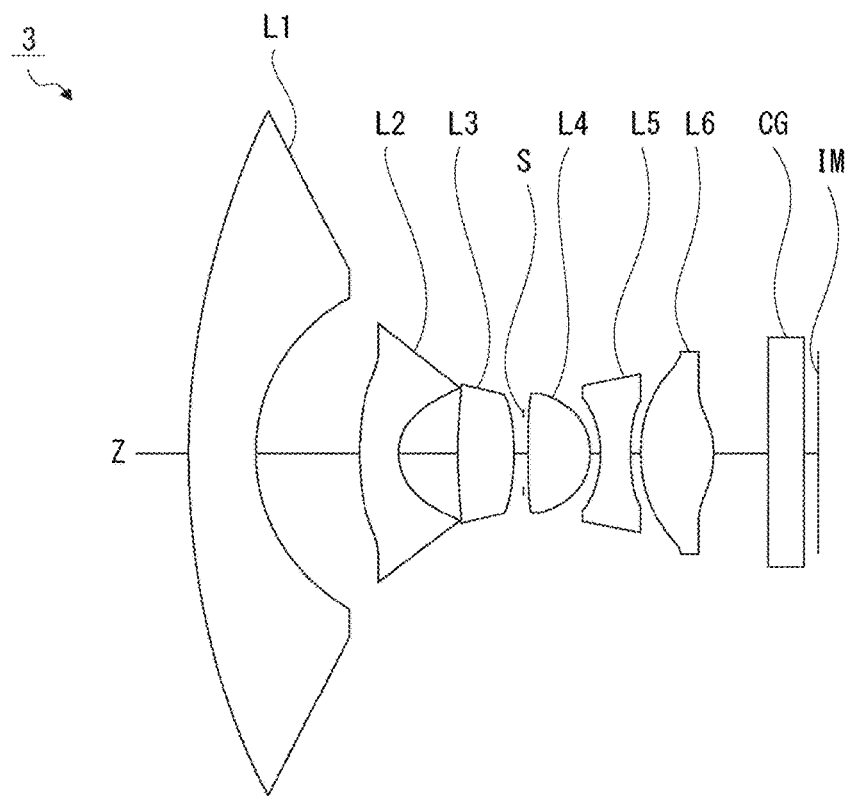
FIG. 5 is a cross-sectional view depicting Third Configuration Example of the imaging lens.
Figure 6:
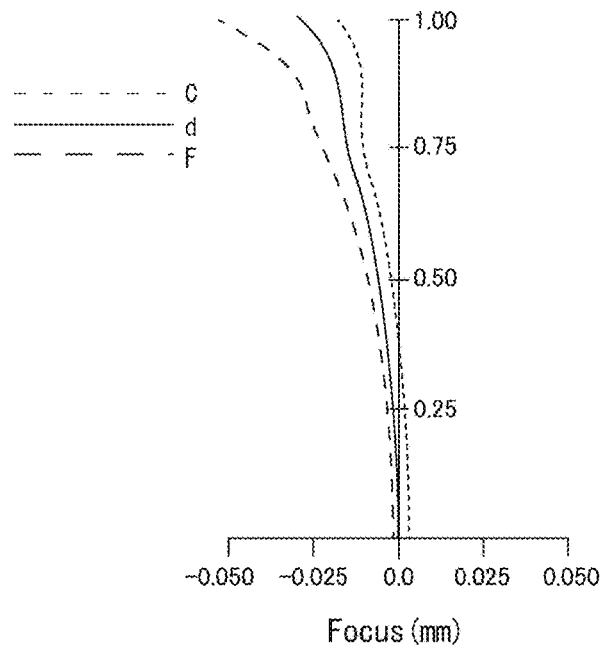
FIG. 6 is an aberration view depicting aberrations in Numerical Example 3 in which concrete numerical values are applied to the imaging lens depicted in FIG. 5.
Figure 6:
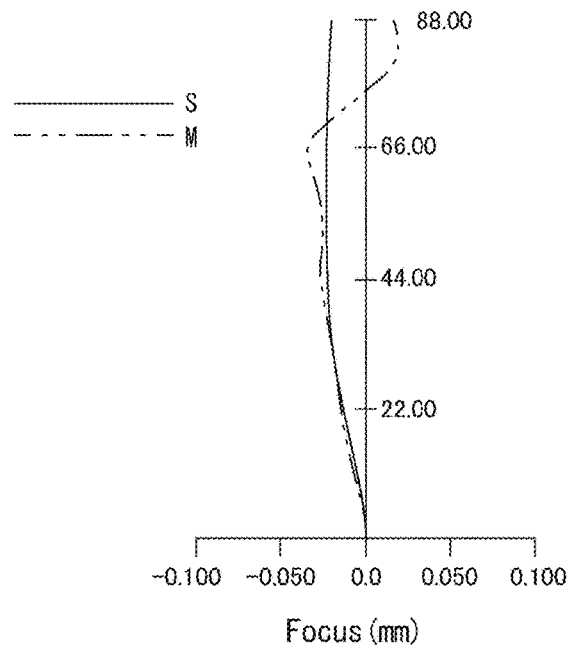

The lens data of Numerical Example 3 in the imaging lens 3 depicted in FIG. 5 is depicted in TABLE 3-1, and the aspherical data thereof is depicted in TABLE 3-2. The total angle of view is 176 degrees, the F-value is 2.03, and the focal length f of the entire system of the imaging lens is 1.059 mm.

TABLE 3-1

| surface number | Ri | Di | Ndi | ν di |
|---|---|---|---|---|
| 1 | 15.619 | 1.300 | 1.589 | 61.3 |
| 2 | 3.500 | 2.103 | | |
| 3* | 40.000 | 0.750 | 1.544 | 55.5 |
| 4* | 1.295 | 1.176 | | |
| 5* | 57.933 | 1.100 | 1.64 | 23.5 |
| 6* | −4.573 | 0.200 | | |
| stop | ∞ | 0.100 | | |
| 8* | 7.129 | 1.200 | 1.544 | 55.5 |
| 9* | −1.217 | 0.200 | | |
| 10* | −4.509 | 0.600 | 1.64 | 23.5 |
| 11* | 1.657 | 0.200 | | |
| 12* | 2.472 | 1.450 | 1.544 | 55.5 |
| 13* | −1.754 | 1.109 | | |
| 14 | ∞ | 0.700 | 1.5168 | 64.2 |
| 15 | ∞ | 0.300 | | |
| IM | ∞ | 0.000 | | |

TABLE 3-2

| aspherical surface | Ki | AAi | ABi | ACi | ADi | AEi |
|---|---|---|---|---|---|---|
| 3 | 0 | 7.4700E−02 | −1.5543E−02 | −3.8971E−04 | 1.9645E−04 | 0 |
| 4 | 0 | 1.2980E−01 | 1.2424E−01 | −3.5824E−02 | −5.3659E−02 | 0 |
| 5 | 0 | 6.5869E−02 | −4.7075E−02 | 5.9450E−02 | −3.4737E−02 | 0 |
| 6 | 0 | 2.6302E−02 | 1.6872E−03 | −5.1524E−02 | 1.5749E−02 | 0 |
| 8 | 0 | −3.0981E−02 | −7.9893E−02 | 9.6587E−03 | −2.3321E−01 | 0 |

TABLE 3-2-continued

| aspherical surface | Ki | AAi | ABi | ACi | ADi | AEi |
|---|---|---|---|---|---|---|
| 9 | 0 | 4.9512E−02 | −4.4215E−02 | 2.5688E−02 | −1.0969E−02 | 0 |
| 10 | 0 | −1.9052E−01 | 2.9301E−02 | 5.3296E−03 | 1.1495E−02 | 0 |
| 11 | 0 | −2.1943E−01 | 7.1252E−02 | −2.2302E−02 | 1.7949E−03 | 0 |
| 12 | 0 | −2.9702E−03 | −8.9736E−03 | 6.5314E−03 | −1.2083E−03 | 0 |
| 13 | 0 | 5.3038E−02 | 2.7086E−02 | −7.9907E−04 | 4.1798E−04 | 0 |

Figure 7:
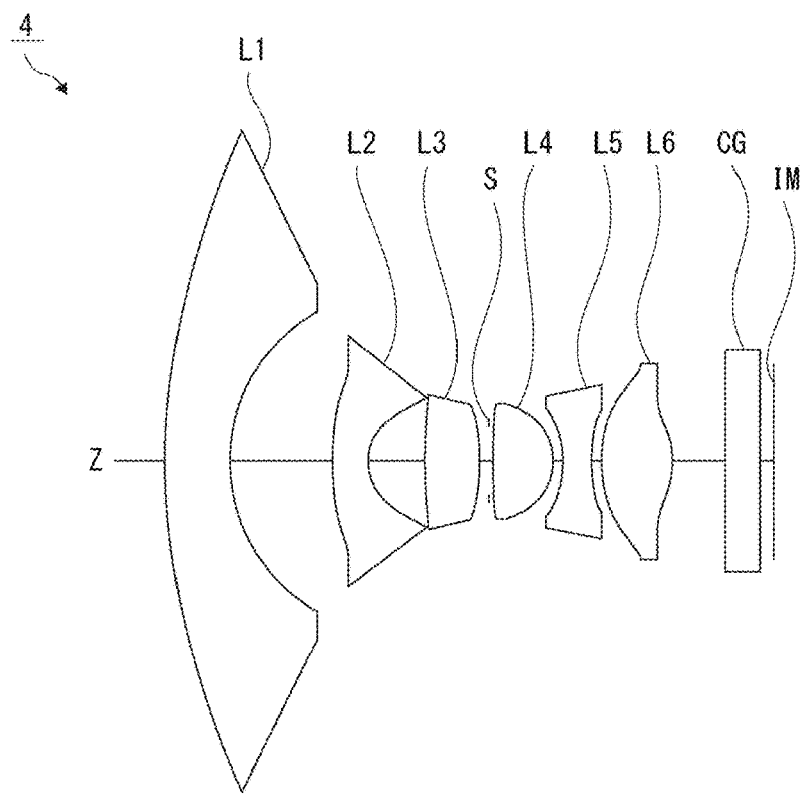
FIG. 7 is a cross-sectional view depicting Fourth Configuration Example of the imaging lens.
Figure 8:
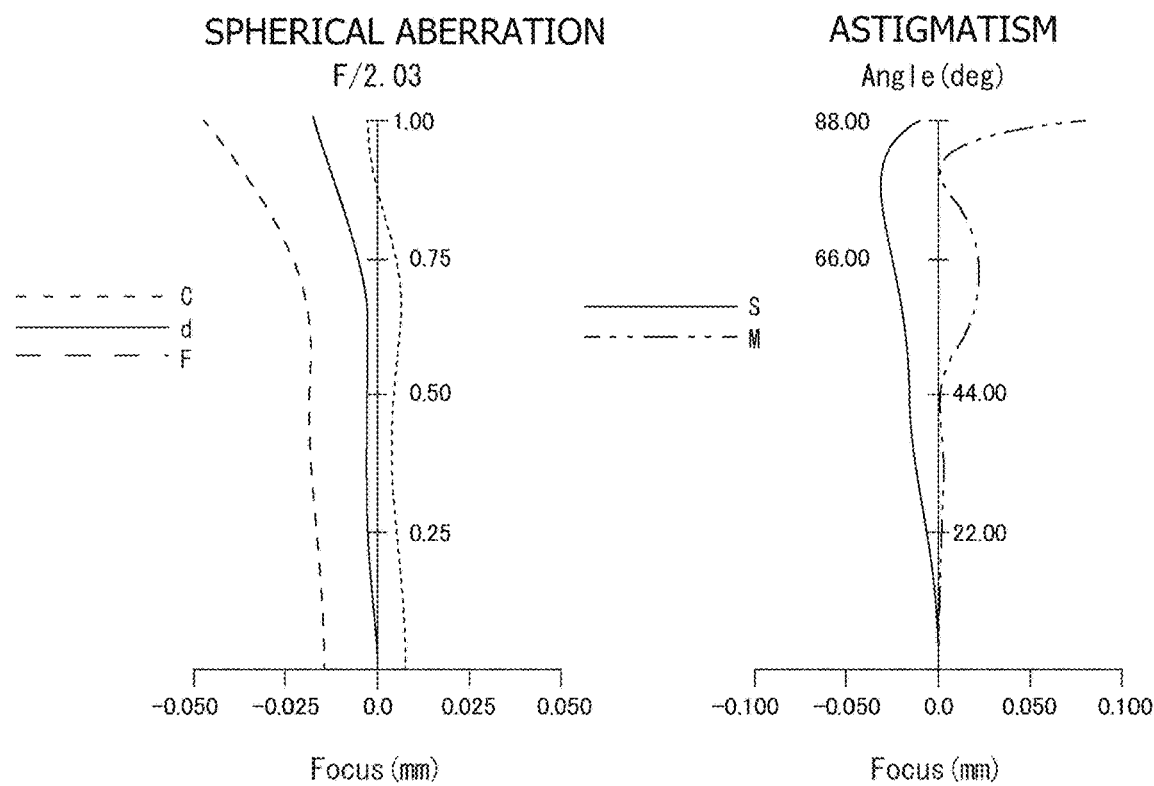
FIG. 8 is an aberration view depicting aberrations in Numerical Example 4 in which concrete numerical values are applied to the imaging lens depicted in FIG. 7.

The lens data of Numerical Example 4 in the imaging lens 4 depicted in FIG. 7 is depicted in TABLE 4-1, and the aspherical surface data thereof is depicted in TABLE 4-2. The total angle of view is 176 degrees, the F-value is 2.03, and the focal length f of the entire system of the imaging lens is 1.061 mm.

TABLE 4-1

| surface number | Ri | Di | Ndi | ν di |
|---|---|---|---|---|
| 1 | 13.330 | 1.300 | 1.589 | 61.3 |
| 2 | 3.500 | 2.046 | | |
| 3* | 1000.000 | 0.750 | 1.544 | 55.5 |
| 4* | 1.257 | 1.148 | | |
| 5* | 100.000 | 1.100 | 1.64 | 23.5 |
| 6* | −2.746 | 0.200 | | |
| stop | ∞ | 0.100 | | |
| 8* | 9.831 | 1.200 | 1.544 | 55.5 |
| 9* | −1.128 | 0.200 | | |
| 10* | −3.089 | 0.600 | 1.64 | 23.5 |
| 11* | 1.774 | 0.200 | | |
| 12* | 2.278 | 1.450 | 1.544 | 55.5 |
| 13* | −1.881 | 0.682 | | |
| 14 | ∞ | 0.700 | 1.5168 | 64.2 |
| 15 | ∞ | 0.300 | | |
| IM | ∞ | 0.000 | | |

TABLE 4-2

| aspherical surface | Ki | AAi | ABi | ACi | ADi | AEi |
|---|---|---|---|---|---|---|
| 3 | 0 | 6.8580E−02 | −1.5170E−02 | 2.5965E−04 | 1.1129E−04 | 0 |
| 4 | 0 | 1.2726E−01 | 6.6065E−02 | 4.5096E−02 | −9.4319E−02 | 0 |
| 5 | 0 | 2.4404E−02 | −3.5869E−03 | 5.4973E−03 | −1.6654E−02 | 0 |
| 6 | 0 | 6.1061E−02 | −2.5347E−02 | −2.6740E−02 | 1.9365E−02 | 0 |
| 8 | 0 | 4.9856E−02 | −1.3287E−01 | 1.4035E−01 | −2.8293E−01 | 0 |
| 9 | 0 | 1.3393E−01 | −5.8046E−02 | 1.1016E−02 | 1.8014E−02 | 0 |
| 10 | 0 | −1.3314E−01 | −1.4061E−02 | 2.9945E−02 | −2.4003E−02 | 0 |
| 11 | 0 | −2.1252E−01 | 9.2328E−02 | −3.5026E−02 | 4.7523E−03 | 0 |
| 12 | 0 | −1.5568E−02 | −2.0091E−03 | 2.2501E−03 | −5.4918E−04 | 0 |
| 13 | 0 | 6.0002E−02 | 3.4173E−02 | −1.1294E−02 | 1.6704E−03 | 0 |

Figure 9:
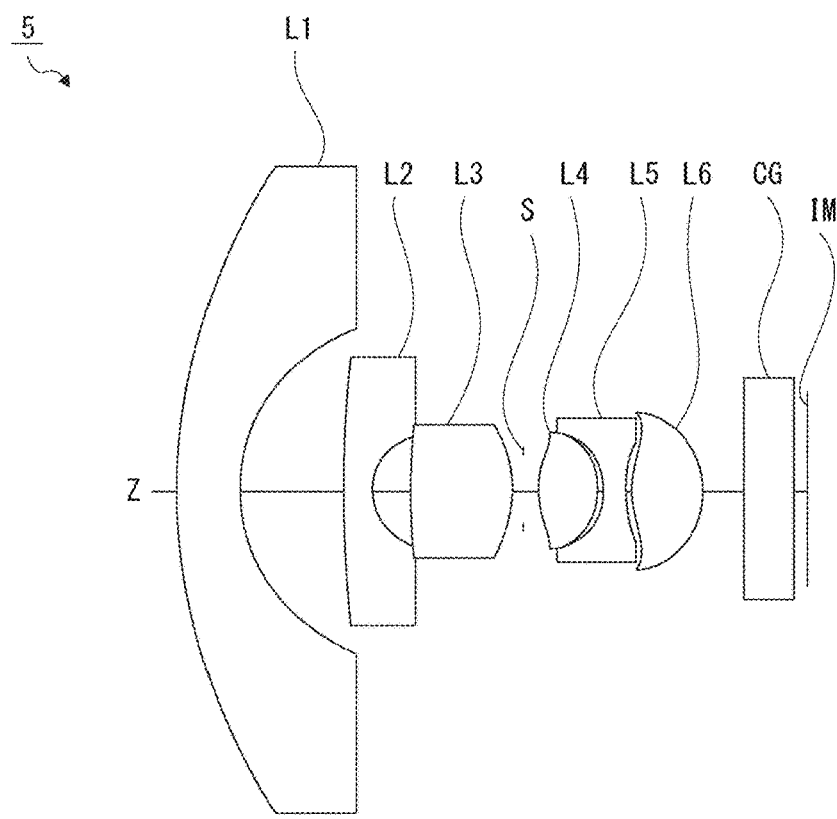
FIG. 9 is a cross-sectional view depicting Fifth Configuration Example of the imaging lens.
Figure 10:
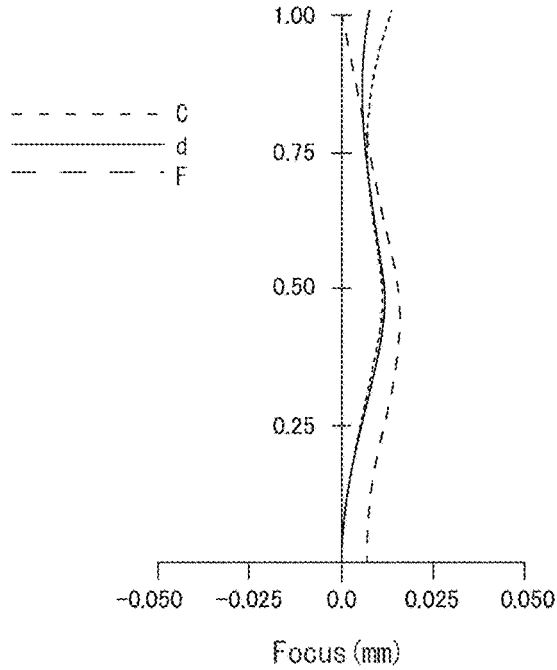
FIG. 10 is an aberration view depicting aberrations in Numerical Example 5 in which concrete numerical values are applied to the imaging lens depicted in FIG. 9.
Figure 10:
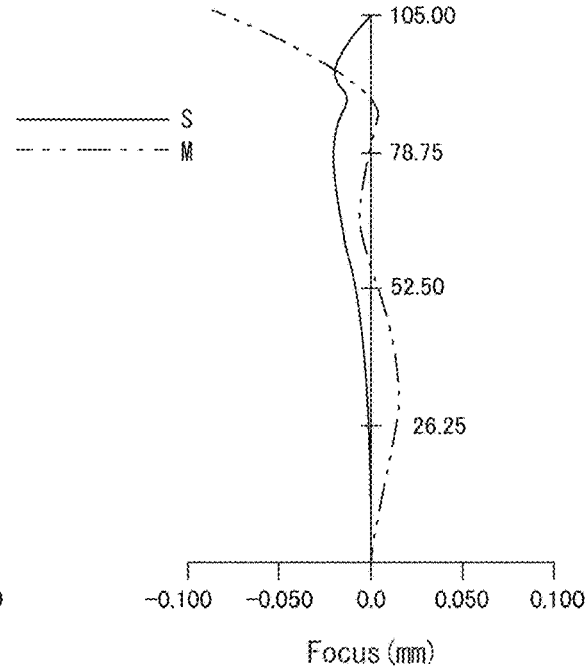

The lens data of Numerical Example 5 in the imaging lens 5 depicted in FIG. 9 is depicted in TABLE 5-1, and the aspherical surface data thereof is depicted in TABLE 5-2. The total angle of view is 210 degrees, the F-value is 2.09, and the focal length f of the entire system of the imaging lens is 1.077 mm.

TABLE 5-1

| surface number | Ri | Di | Ndi | ν di |
|---|---|---|---|---|
| 1 | 11.604 | 1.300 | 1.589 | 61.3 |
| 2 | 3.500 | 2.150 | | |
| 3* | 4015.355 | 0.582 | 1.544 | 55.5 |
| 4* | 1.191 | 0.923 | | |
| 5* | 5084.865 | 1.923 | 1.64 | 23.5 |
| 6* | −3.741 | 0.256 | | |
| stop | ∞ | 0.316 | | |
| 8* | 1.894 | 1.235 | 1.544 | 55.5 |

TABLE 5-1-continued

| surface number | Ri | Di | Ndi | ν di |
|---|---|---|---|---|
| 9* | −1.398 | 0.100 | | |
| 10* | −1.388 | 0.480 | 1.64 | 23.5 |
| 11* | 2.450 | 0.100 | | |
| 12* | 2.788 | 1.455 | 1.544 | 55.5 |
| 13* | −1.594 | 0.893 | | |
| 14 | ∞ | 1.000 | 1.5168 | 64.2 |
| 15 | ∞ | 0.300 | | |
| IM | ∞ | 0.000 | | |

TABLE 5-2

| aspherical surface | Ki | AAi | ABi | ACi | ADi | AEi |
|---|---|---|---|---|---|---|
| 3 | 0 | 4.1418E−03 | −2.5227E−04 | 4.5632E−06 | 0 | 0 |
| 4 | 0 | 1.1635E−02 | −1.3295E−02 | 7.1655E−03 | 0 | 0 |
| 5 | 0 | −1.5043E−02 | −6.7712E−03 | 1.0319E−03 | 0 | 0 |
| 6 | 0 | −4.9215E−02 | 1.6202E−02 | −5.0070E−03 | 0 | 0 |
| 8 | 0 | −4.4369E−02 | 6.1780E−02 | −6.1856E−02 | 0 | 0 |
| 9 | 0 | 8.5705E−02 | −8.1665E−03 | −7.8189E−02 | 0 | 0 |
| 10 | 0 | −2.1900E−03 | −5.1467E−03 | −7.0914E−02 | 0 | 0 |
| 11 | 0 | −4.2037E−02 | −3.2857E−03 | 7.1188E−03 | 0 | 0 |
| 12 | 0 | −4.2164E−02 | −5.9264E−03 | −1.0007E−03 | 0 | 0 |
| 13 | 0 | 2.6213E−02 | 3.3206E−03 | 9.0764E−04 | 0 | 0 |

Figure 11:
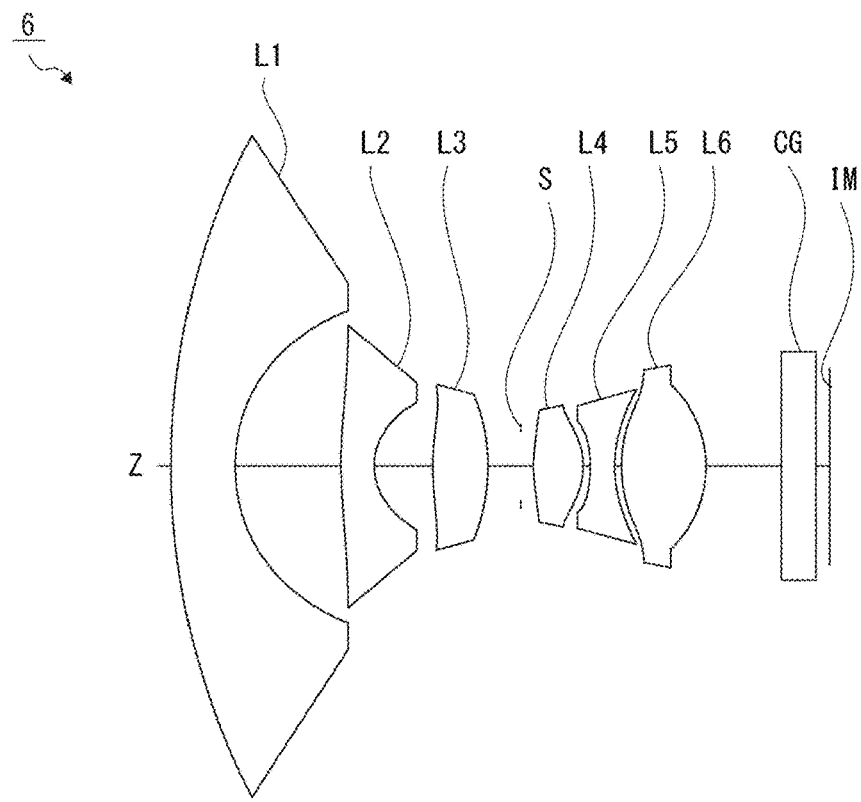
FIG. 11 is a cross-sectional view depicting Sixth Configuration Example of the imaging lens.
Figure 12:
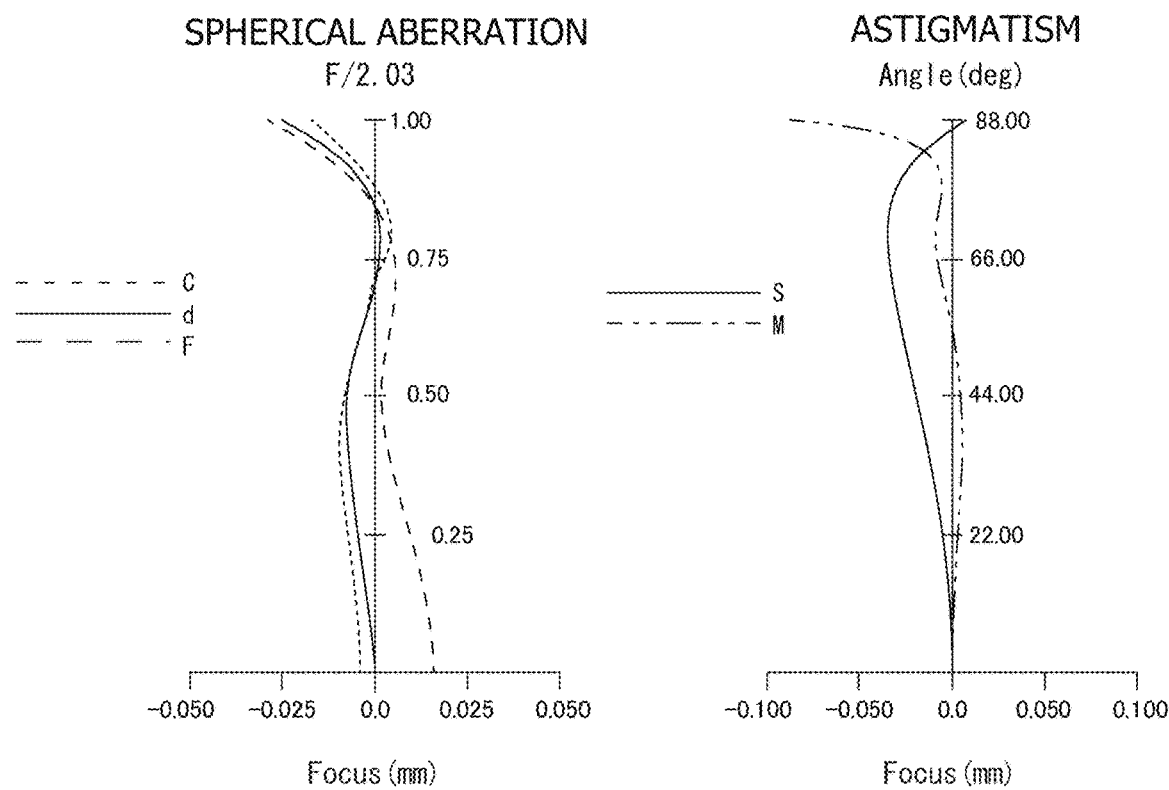
FIG. 12 is an aberration view depicting aberrations in Numerical Example 6 in which concrete numerical values are applied to the imaging lens depicted in FIG. 11.

The lens data of Numerical Example 6 in the imaging lens 6 depicted in FIG. 11 is depicted in TABLE 6-1, and the aspherical surface data thereof is depicted in TABLE 6-2. The total angle of view is 176 degrees, the F-value is 2.03, and the focal length f of the entire system of the imaging lens is 1.212 mm.

TABLE 6-1

| surface number | Ri | Di | Ndi | ν di |
|---|---|---|---|---|
| 1 | 14.635 | 1.300 | 1.589 | 61.3 |
| 2 | 3.300 | 2.150 | | |
| 3* | 59.015 | 0.700 | 1.544 | 55.5 |
| 4* | 1.505 | 1.239 | | |
| 5* | 170.395 | 1.100 | 1.64 | 23.5 |
| 6* | −3.358 | 0.600 | | |
| stop | ∞ | 0.300 | | |
| 8* | 4.696 | 1.000 | 1.544 | 55.5 |
| 9* | −1.322 | 0.100 | | |
| 10* | −2.020 | 0.600 | 1.64 | 23.5 |
| 11* | 1.813 | 0.100 | | |
| 12* | 2.068 | 1.720 | 1.544 | 55.5 |
| 13* | −1.815 | 1.537 | | |
| 14 | ∞ | 0.700 | 1.5168 | 64.2 |
| 15 | ∞ | 0.300 | | |
| IM | ∞ | 0.000 | | |

TABLE 6-2

| aspherical surface | Ki | AAi | ABi | ACi | ADi | AEi |
|---|---|---|---|---|---|---|
| 3 | 0 | 4.1497E−02 | −1.5625E−02 | 2.2025E−03 | −1.1031E−04 | 0 |
| 4 | −5.9384E−01 | 9.0286E−02 | 3.3391E−02 | −2.5722E−02 | 2.7371E−03 | 0 |
| 5 | 0 | 1.9561E−02 | 9.3475E−04 | −2.5432E−03 | −2.4956E−03 | 0 |
| 6 | 0 | 7.2756E−03 | 5.7725E−03 | −1.4023E−02 | 4.2448E−03 | 0 |
| 8 | 0 | 9.6009E−03 | −1.2195E−02 | 9.9662E−03 | −1.6130E−03 | 0 |
| 9 | 0 | 1.4833E−01 | 4.9579E−02 | −8.4333E−02 | 4.7589E−02 | 0 |
| 10 | 0 | 3.4507E−03 | 1.1315E−01 | −1.0935E−01 | 3.2839E−02 | 0 |
| 11 | 0 | −1.5926E−01 | 8.8791E−02 | −3.2109E−02 | 3.4126E−03 | 0 |
| 12 | 0 | −9.0759E−02 | 1.2525E−02 | 3.6720E−03 | −1.3550E−03 | 0 |
| 13 | −4.3112E−01 | 2.0741E−02 | −4.3675E−03 | 2.2668E−03 | −1.9499E−03 | 5.4280E−04 |

Figure 13:
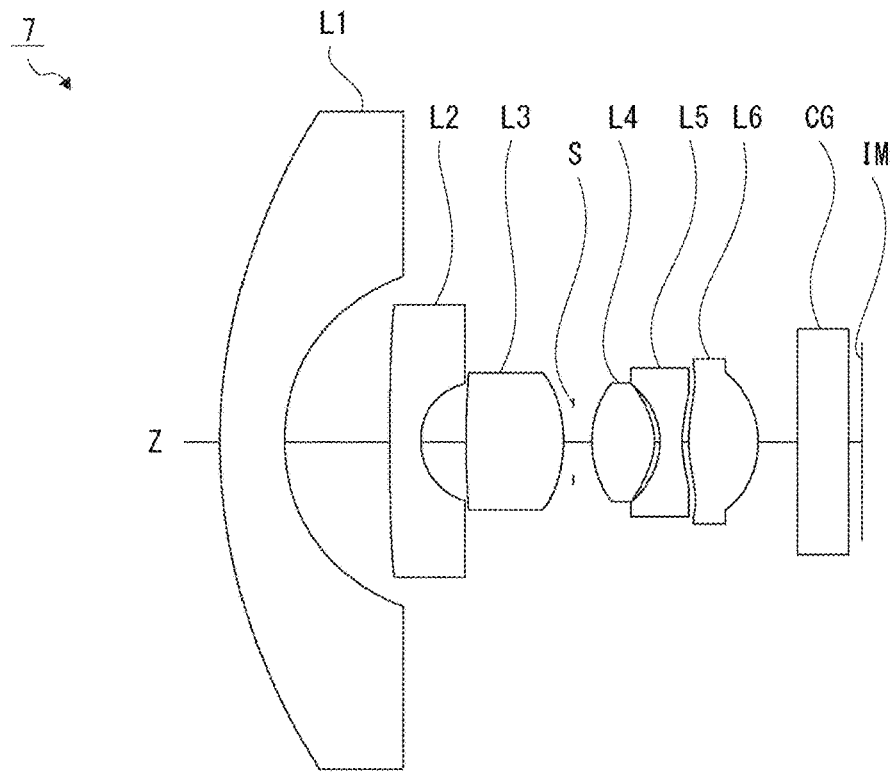
FIG. 13 is a cross-sectional view depicting Seventh Configuration Example of the imaging lens.
Figure 14:
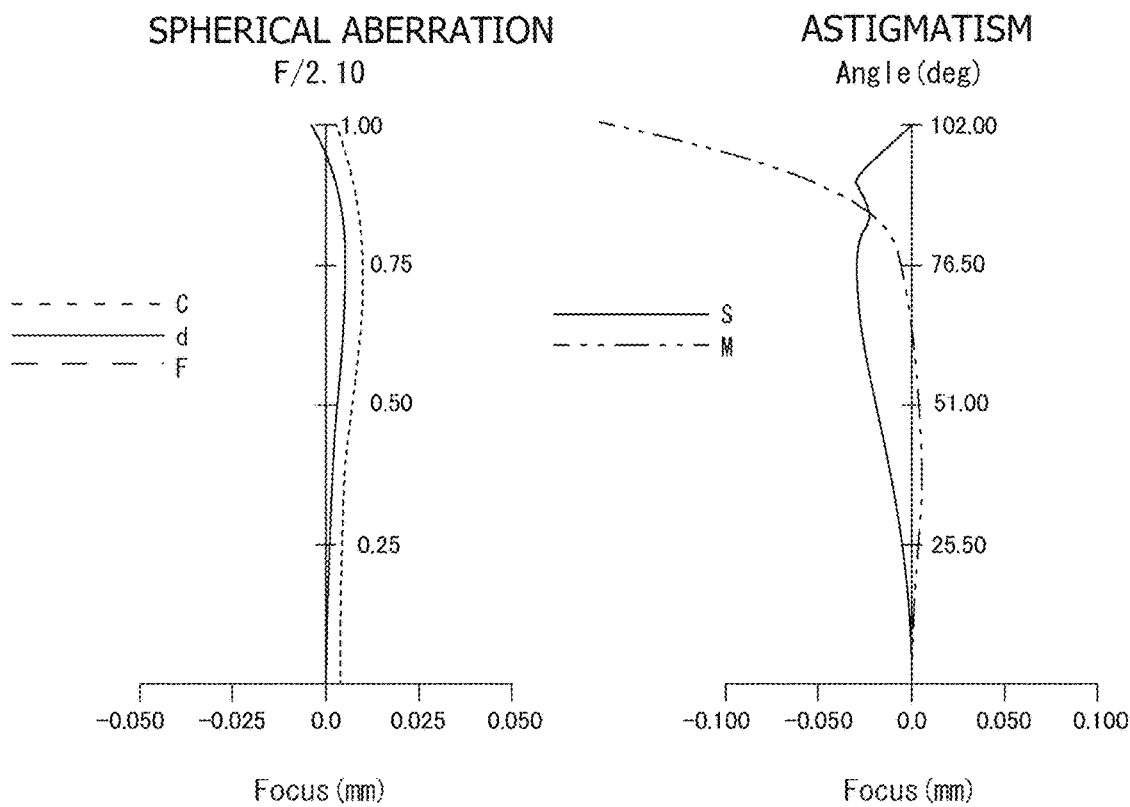
FIG. 14 is an aberration view depicting aberrations in Numerical Example 7 in which concrete numerical values are applied to the imaging lens depicted in FIG. 13.

The lens data of Numerical Example 7 in the imaging lens 7 depicted in FIG. 13 is depicted in TABLE 7-1, and the aspherical surface data thereof is depicted in TABLE 7-2. The total angle of view is 204 degrees, the F-value is 2.10, and the focal length f of the entire system of the imaging lens is 1.083 mm.

TABLE 7-1

| surface number | Ri | Di | Ndi | ν di |
|---|---|---|---|---|
| 1 | 12.093 | 1.300 | 1.589 | 61.3 |
| 2 | 3.500 | 2.150 | | |
| 3* | 4000.018 | 0.700 | 1.544 | 55.5 |
| 4* | 1.262 | 1.239 | | |
| 5* | 5089.112 | 1.100 | 1.64 | 23.5 |
| 6* | −3.375 | 0.600 | | |
| stop | ∞ | 0.300 | | |
| 8* | 2.049 | 1.000 | 1.544 | 55.5 |
| 9* | −1.626 | 0.100 | | |
| 10* | −1.584 | 0.600 | 1.64 | 23.5 |
| 11* | 2.908 | 0.100 | | |
| 12* | 3.041 | 1.720 | 1.544 | 55.5 |
| 13* | −1.652 | 1.537 | | |
| 14 | ∞ | 0.700 | 1.5168 | 64.2 |
| 15 | ∞ | 0.300 | | |
| IM | ∞ | 0.000 | | |

TABLE 7-2

| aspherical surface | Ki | AAi | ABi | ACi | ADi | AEi |
|---|---|---|---|---|---|---|
| 3 | 0 | 3.1000E−04 | 9.3291E−05 | −1.2985E−06 | 0 | 0 |
| 4 | 0 | 2.2310E−02 | 2.4191E−03 | −6.5561E−04 | 0 | 0 |
| 5 | 0 | 5.4302E−03 | −4.1216E−03 | −4.0870E−04 | 0 | 0 |
| 6 | 0 | −1.7038E−02 | −1.6946E−03 | −4.3891E−04 | 0 | 0 |
| 8 | 0 | −3.9889E−03 | −2.1324E−04 | −2.5853E−04 | 0 | 0 |
| 9 | 0 | 5.2084E−02 | −1.6906E−02 | 8.3259E−04 | 0 | 0 |
| 10 | 0 | −1.6914E−02 | 1.0224E−02 | −9.1089E−04 | 0 | 0 |
| 11 | 0 | −1.6800E−02 | 8.5622E−03 | 1.4852E−04 | 0 | 0 |
| 12 | 0 | −3.3545E−02 | −6.6507E−03 | −1.6852E−04 | 0 | 0 |
| 13 | 0 | 2.1412E−02 | 4.2337E−03 | 6.9884E−05 | 0 | 0 |

Hereinafter, values of main specifications, and the conditional expression (1) to the conditional expression (9) of Numerical Example 1 to Numerical Example 7 are depicted in TABLE 8.

TABLE 8

| | | Example 1 | Example 2 | Example 3 | Example 4 | Example 5 | Example 6 | Example 7 |
|---|---|---|---|---|---|---|---|---|
| specification | total angle of view | 176 | 176 | 176 | 176 | 210 | 176 | 204 |
| specification | F-value | 2.03 | 2.05 | 2.03 | 2.03 | 2.09 | 2.03 | 2.10 |
| specification | Entire system focal length (f) | 1.027 | 1.043 | 1.059 | 1.061 | 1.077 | 1.212 | 1.083 |
| con. exp. (1) | R5/f | 165.9 | 606.0 | 54.7 | 94.2 | 4721.9 | 140.6 | 4698.6 |
| con. exp. (2) | f6/f | 1.925 | 2.011 | 2.026 | 2.035 | 1.961 | 1.737 | 2.040 |
| con. exp. (3) | R4/f2 | −0.543 | −0.543 | −0.523 | −0.543 | −0.544 | −0.528 | −0.544 |
| con. exp. (4) | f123/f456 | −2.426 | −2.210 | −1.400 | −5.005 | −1.622 | −2.798 | −2.378 |
| con. exp. (5) | (R3 + R4)/(R3 − R4) | 1.0020 | 1.0034 | 1.0669 | 1.0025 | 1.0006 | 1.0523 | 1.0006 |
| con. exp. (6) | R5/R6 | −50.7 | −161.0 | −12.7 | −36.4 | −1359.1 | −50.7 | −1508.0 |
| con. exp. (7) | R3/f | 1239.5 | 756.2 | 37.8 | 942.4 | 3728.8 | 48.7 | 3693.1 |
| con. exp. (8) | R3/R4 | 982.11 | 585.55 | 30.89 | 795.71 | 3371.92 | 38.21 | 3168.89 |
| con. exp. (9) | (R5 + R6)/(R5 − R6) | 0.961 | 0.988 | 0.854 | 0.947 | 0.999 | 0.961 | 0.999 |
| | f6 | 1.97721 | 2.09702 | 2.14514 | 2.15885 | 2.1116 | 2.10517 | 2.20908 |
| | f2 | −2.38584 | −2.49311 | −2.47711 | −2.31371 | −2.18977 | −2.85114 | −2.32136 |
| | f123 | −6.21372 | −6.22441 | −3.58331 | −12.9428 | −4.51154 | −8.23553 | −6.66247 |
| | f456 | 2.58141 | 2.81697 | 2.54522 | 2.58593 | 2.78108 | 2.94353 | 2.80194 |

As depicted in TABLE 8, Numerical Example 1 to Numerical Example 7 fulfill all the conditional expression (1) to the conditional expression (9).

The spherical aberrations and the astigmatisms of Numerical Example 1 to Numerical Example 7 are depicted in FIG. 2, FIG. 4, FIG. 6, FIG. 8, FIG. 10, FIG. 12, and FIG. 14. In each of the figures, in the spherical aberration, a short dotted line depicts values of a C-line (656.27 nm), a solid line depicts a d-line (587.56 nm), and a long dotted line depicts an F-line (486.13 nm). In addition, in the astigmatism, a solid line depicts values of a sagittal image surface of the d-line, and a broken line depicts values of a meridional image surface of the d-line.

It is obvious from the aberration diagrams that Numerical Example 1 to Numerical Example 7 are satisfactorily corrected in aberrations thereof, and have the excellent imaging performance.

[Installation Examples as On-Board Use Applications]

Figure 15:
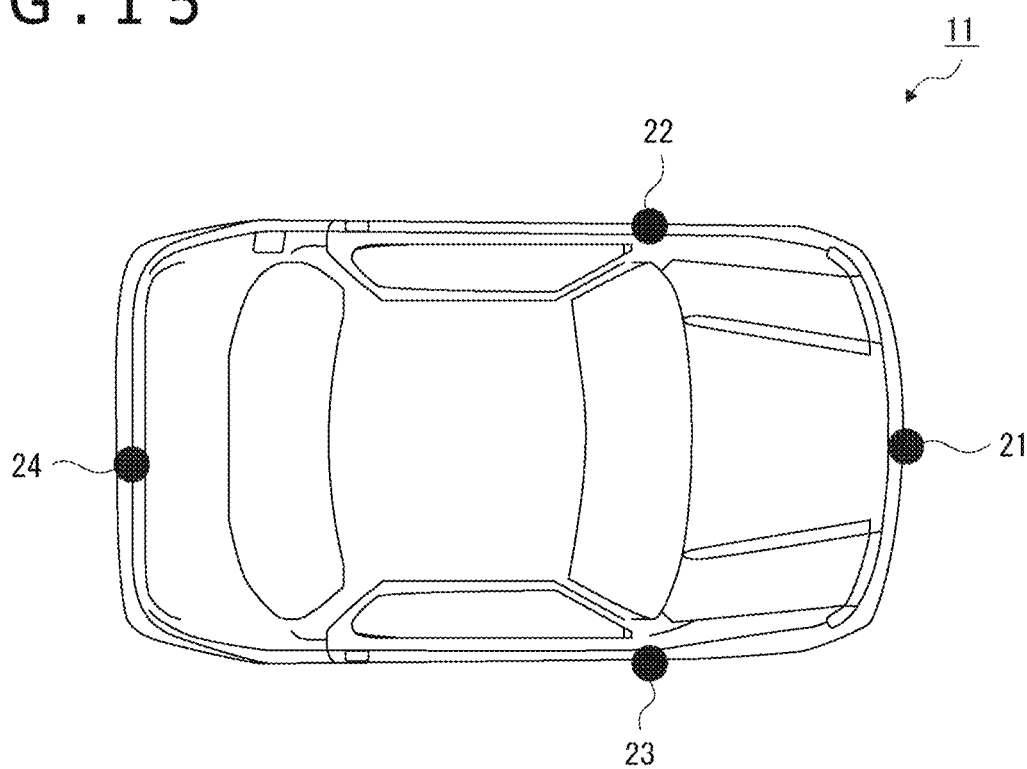
FIG. 15 is an explanatory view depicting Installation Example 1 as an on-board use application.
Figure 16:
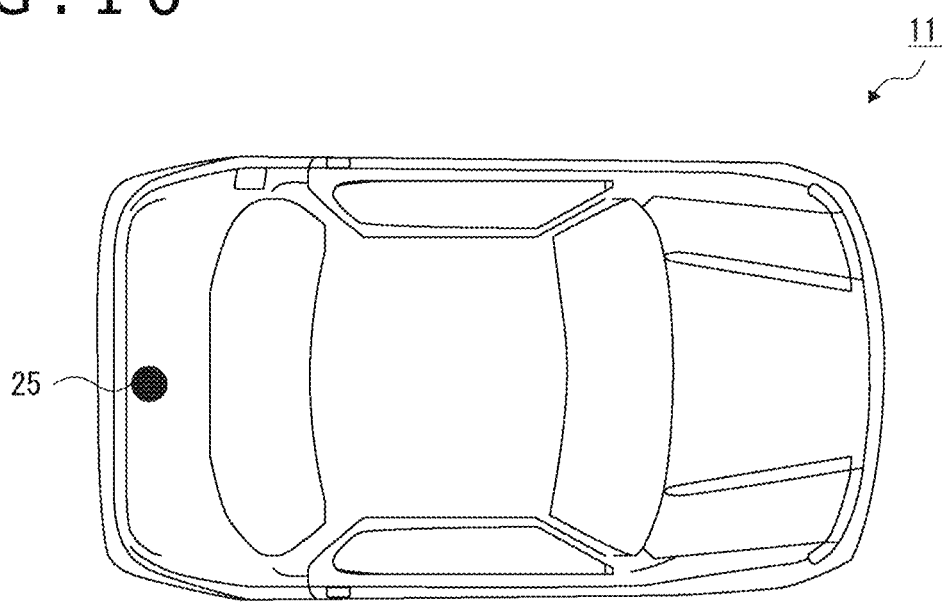
FIG. 16 is an explanatory view depicting Installation Example 2 as an on-board use application.

Installation Example 1 as an on-board use application is depicted in FIG. 15, and Installation Example 2 is depicted in FIG. 16.

Installation Example 1 as an on-board use application is Installation Example in which four cameras using the imaging cameras, capture an image of 360 degrees around a vehicle 11. For example, a camera 21 is installed in the front, a camera 22 and a camera 23 are installed in side surfaces, and a camera 24 is installed in the rear. Images captured by the cameras 21, 22, 23, and 24 are synthesized, thereby obtaining the image of 360 degrees. A lens having a specification in which the total angle of view is 200 degrees or more, and a horizontal total angle of view is 180 degrees or more is desirably used as the imaging lens.

Installation Example 2 as an on-board use application is Installation Example in which an image in the rear of the vehicle 11 is captured by one camera. For example, a camera 25 is installed in the rear. A lens having a specification in which a total angle of view is equal to or larger than 150 degrees and equal to or smaller than 190 degrees, and a horizontal angle of view is equal to or larger than 120 degrees and equal to or smaller than 160 degrees is desirably used as the imaging lens.

[Others]

In the imaging lens of the present technique, other optical element such as a lens having no refracting power may be arranged in addition to the first lens L1 to the sixth lens L6. In this case, the lens configuration of the imaging lens of the present technique is made a lens configuration substantially having six sheets of lenses of the first lens L1 to the sixth lens L6.

[The Present Technique]

The present technique can also be configured as follows.

<1>

An imaging lens, including:

a first lens having a negative refracting power and having a meniscus shape in which a convex surface is directed toward an object side;

a second lens having a negative refracting power and having a meniscus shape in which a convex surface is directed toward the object side;

a third lens having a positive refracting power and having a bi-convex shape;

an aperture stop;

a fourth lens having a positive refracting power and having a bi-convex shape;

a fifth lens having a negative refracting power and having a bi-concave shape; and a sixth lens having a positive refracting power and having a bi-convex shape, the first lens, the second lens, the third lens, the aperture stop, the fourth lens, the fifth lens, and the sixth lens being arranged in order from the object side to an image surface side, the imaging lens being constituted by six groups and six sheets of independent lenses as a whole, a total angle of view being set to 150 degrees or more, a following conditional expression (1) being fulfilled.

$$40<R5/f \quad (1)$$

where

R5: a radius of curvature on an optical axis of the surface on the object side of the third lens f: a focal length of an entire system

<2>

The imaging lens according to <1> described above, in which a following conditional expression (2) is fulfilled.

$$1.5<f6/f<2.05 \quad (2)$$

where f6: a focal length of the sixth lens f: a focal length of the entire system

<3>

The imaging lens according to <1> or <2> described above, in which a following conditional expression (3) is fulfilled.

$$-0.6<R4/f2<-0.52 \quad (3)$$

where

R4: a radius of curvature on the optical axis of the surface on an image side of the second lens f2: a focal length of the second lens

<4>

The imaging lens according to any one of <1> to <3> described above, in which a following conditional expression (4) is fulfilled.

$$-5.5<f123/f456<-1.35 \quad (4)$$

where f123: a synthetic focal length of the first lens, the second lens, and the third lens f456: a synthetic focal length of the fourth lens, the fifth lens, and the sixth lens

<5>

The imaging lens according to any one of <1> to <4> described above, in which a following conditional expression (5) is fulfilled.

$$1<(R3+R4)/(R3-R4)<1.067 \quad (5)$$

where

R3: a radius of curvature on the optical axis of the surface on the object side of the second lens R4: a radius of curvature on the optical axis of the surface on the image side of the second lens

<6>

An imaging lens, including:

a first lens having a negative refracting power and having a meniscus shape in which a convex surface is directed toward an object side;

a second lens having a negative refracting power and having a meniscus shape in which a convex surface is directed toward the object side;

a third lens having a positive refracting power and having a bi-convex shape;

an aperture stop;

a fourth lens having a positive refracting power and having a bi-convex shape;

a fifth lens having a negative refracting power and having a bi-concave shape; and a sixth lens having a positive refracting power and having a bi-convex shape, the first lens, the second lens, the third lens, the aperture stop, the fourth lens, the fifth lens, and the sixth lens being arranged in order from the object side to an image surface side, the imaging lens being constituted by six groups and six sheets of independent lenses as a whole, a total angle of view being set to 150 degrees or more, a following conditional expression (6) being fulfilled.

$$R5/R6<-10 \quad (6)$$

where

R5: a radius of curvature on an optical axis of the surface on the object side of the third lens R6: a radius of curvature on the optical axis of the surface on an image side of the third lens

<7>

The imaging lens according to <6> described above, in which a following conditional expression (2) is fulfilled.

$$1.5<f6/f<2.05 \quad (2)$$

where f6: a focal length of the sixth lens f: a focal length of the entire system

<8>

The imaging lens according to <6> or <7> described above, in which a following conditional expression (3) is fulfilled.

$$-0.6<R4/f2<-0.52 \quad (3)$$

where
R4: a radius of curvature on the optical axis of the surface on the image side of the second lens
f2: a focal length of the second lens

<9>

The imaging lens according to any one of <6> to <8> described above, in which a following conditional expression (4) is fulfilled.

$$-5.5 < f123/f456 < -1.35 \quad (4)$$

where
f123: a synthetic focal length of the first lens, the second lens, and the third lens
f456: a synthetic focal length of the fourth lens, the fifth lens, and the sixth lens

<10>

The imaging lens according to any one of <6> to <9> described above, in which a following conditional expression (5) is fulfilled.

$$1 < (R3+R4)/(R3-R4) < 1.067 \quad (5)$$

where
R3: a radius of curvature on the optical axis of the surface on the object side of the second lens
R4: a radius of curvature on the optical axis of the surface on the image side of the second lens

<11>

An imaging lens, including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a bi-convex shape;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the imaging lens being constituted by six groups and six sheets of independent lenses as a whole,
a total angle of view being set to 150 degrees or more,
a following conditional expression (7) being fulfilled.

$$34 < R3/f \quad (7)$$

where
R3: a radius of curvature on an optical axis of the surface on the object side of the second lens
f: a focal length of an entire system

<12>

The imaging lens according to <11> described above, in which a following conditional expression (2) is fulfilled.

$$1.5 < f6/f < 2.05 \quad (2)$$

where
f6: a focal length of the sixth lens
f: a focal length of the entire system

<13>

The imaging lens according to <11> or <12> described above, in which a following conditional expression (3) is fulfilled.

$$-0.6 < R4/f2 < -0.52 \quad (3)$$

where
R4: a radius of curvature on the optical axis of the surface on an image side of the second lens
f2: a focal length of the second lens

<14>

The imaging lens according to any one of <11> to <13> described above, in which a following conditional expression (4) is fulfilled.

$$-5.5 < f123/f456 < -1.35 \quad (4)$$

where
f123: a synthetic focal length of the first lens, the second lens, and the third lens
f456: a synthetic focal length of the fourth lens, the fifth lens, and the sixth lens

<15>

The imaging lens according to any one of <11> to <14> described above, in which a following conditional expression (5) is fulfilled.

$$1 < (R3+R4)/(R3-R4) < 1.067 \quad (5)$$

where
R3: a radius of curvature on the optical axis of the surface on the object side of the second lens
R4: a radius of curvature on an image side of the second lens

<16>

An imaging lens, including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a bi-convex shape;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the imaging lens being constituted by six groups and six sheets of independent lenses as a whole,
a total angle of view being set to 150 degrees or more,
a following conditional expression (8) being fulfilled.

$$30.5 < R3/R4 \quad (8)$$

where
R3: a radius of curvature on an optical axis of the surface on the object side of the second lens
R4: a radius of curvature on the optical axis of the surface on an image side of the second lens

<17>

The imaging lens according to <16> described above, in which a following conditional expression (2) is fulfilled.

$$1.5 < f6/f < 2.05 \quad (2)$$

where
f6: a focal length of the sixth lens
f: a focal length of the entire system
<18>
The imaging lens according to <16> or <17> described above, in which a following conditional expression (3) is fulfilled.

$$-0.6<R4/f2<-0.52 \quad (3)$$

where
R4: a radius of curvature on the optical axis of the surface on the image side of the second lens
f2: a focal length of the second lens
<19>
The imaging lens according any one of <16> to <18> described above, in which a following conditional expression (4) is fulfilled.

$$-5.5<f123/f456<-1.35 \quad (4)$$

where
f123: a synthetic focal length of the first lens, the second lens, and the third lens
f456: a synthetic focal length of the fourth lens, the fifth lens, and the sixth lens
<20>
The imaging lens according to any one of <16> to <19> described above, in which a following conditional expression (5) is fulfilled.

$$1<(R3+R4)/(R3-R4)<1.067 \quad (5)$$

where
R3: a radius of curvature on the optical axis of the surface on the object side of the second lens
R4: a radius of curvature on the optical axis of the surface on the image side of the second lens
<21>
An imaging lens, including:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a bi-convex shape;
an aperture stop;
a fourth lens having a positive refracting power and having a bi-convex shape;
a fifth lens having a negative refracting power and having a bi-concave shape; and
a sixth lens having a positive refracting power and having a bi-convex shape,
the first lens, the second lens, the third lens, the aperture stop, the fourth lens, the fifth lens, and the sixth lens being arranged in order from the object side to an image surface side,
the imaging lens being constituted by six groups and six sheets of independent lenses as a whole,
a total angle of view being set to 150 degrees or more,
a following conditional expression (9) being fulfilled.

$$0.8<(R5+R6)/(R5-R6)<1 \quad (9)$$

where
R5: a radius of curvature on an optical axis of the surface on the object side of the third lens
R6: a radius of curvature on the optical axis of the surface on an image side of the third lens <22>
The imaging lens according to <21> described above, in which a following conditional expression (2) is fulfilled.

$$1.5<f6/f<2.05 \quad (2)$$

where
f6: a focal length of the sixth lens
f: a focal length of the entire system
<23>
The imaging lens according to <21> or <22> described above, in which a following conditional expression (3) is fulfilled.

$$-0.6<R4/f2<-0.52 \quad (3)$$

where
R4: a radius of curvature on the optical axis of the surface on the image side of the second lens
f2: a focal length of the second lens
<24>
The imaging lens according to any one of <21> to <23> described above, in which a following conditional expression (4) is fulfilled.

$$-5.5<f123/f456<-1.35 \quad (4)$$

where
f123: a synthetic focal length of the first lens, the second lens, and the third lens
f456: a synthetic focal length of the fourth lens, the fifth lens, and the sixth lens
<25>
The imaging lens according to any one of <21> to <24> described above, in which a following conditional expression (5) is fulfilled.

$$1<(R3+R4)/(R3-R4)<1.067 \quad (5)$$

where
R3: a radius of curvature on the optical axis of the surface on the object side of the second lens
R4: a radius of curvature on the optical axis of the surface on the image side of the second lens

REFERENCE SIGNS LIST

1 . . . Imaging lens, 2 . . . Imaging lens, 3 . . . Imaging lens, 4 . . . Imaging lens, 5 . . . Imaging lens, 6 . . . Imaging lens, 7 . . . Imaging lens, L1 . . . First lens, L2 . . . Second lens, L3 . . . Third lens, L4 . . . Fourth lens, L5 . . . Fifth lens, L6 . . . Sixth lens, S . . . Aperture stop, CG . . . Parallel plate, IM . . . Image surface, Z . . . Optical axis

The invention claimed is:
1. An imaging lens, comprising:
a first lens having a negative refracting power and having a meniscus shape in which a convex surface is directed toward an object side;
a second lens having a negative refracting power and having a meniscus shape in which a convex surface is directed toward the object side;
a third lens having a positive refracting power and having a bi-convex shape;
an aperture stop;
a fourth lens having a positive refracting power and having a bi-convex shape;
a fifth lens having a negative refracting power and having a bi-concave shape; and
a sixth lens having a positive refracting power and having a bi-convex shape, the first lens, the second lens, the third lens, the aperture stop, the fourth lens, the fifth lens, and the sixth lens being arranged in order from the object side to an image surface side, the imaging lens being constituted by six groups and six sheets of independent lenses as a whole, a total angle of view being set to 150 degrees or more, a following conditional expression (1) being fulfilled:

$$40 < R5/f \quad (1)$$

where

R5 is a radius of curvature on an optical axis of a surface on the object side of the third lens and f is a focal length of an entire system.

2. The imaging lens according to claim 1, wherein a following conditional expression (2) is fulfilled:

$$1.5 < f6/f < 2.05 \quad (2)$$

where f6 is a focal length of the sixth lens.

3. The imaging lens according to claim 1, wherein a following conditional expression (3) is fulfilled:

$$-0.6 < R4/f2 < -0.52 \quad (3)$$

where

R4 is a radius of curvature on an optical axis of a surface on an image side of the second lens and f2 is a focal length of the second lens.

4. The imaging lens according to claim 1, wherein a following conditional expression (4) is fulfilled:

$$-5.5 < f123/f456 < -1.35 \quad (4)$$

where f123 is a synthetic focal length of the first lens, the second lens, and the third lens and f456 is a synthetic focal length of the fourth lens, the fifth lens, and the sixth lens.

5. The imaging lens according to claim 1, wherein a following conditional expression (5) is fulfilled:

$$1 < (R3+R4)/(R3-R4) < 1.067 \quad (5)$$

where

R3 is a radius of curvature on an optical axis of a surface on the object side of the second lens and R4 is a radius of curvature on an optical axis of a surface on the image side of the second lens.

6. An imaging apparatus, comprising:

an imaging sensor; and an imaging lens, including:

a first lens having a negative refracting power and having a meniscus shape in which a convex surface is directed toward an object side;

a second lens having a negative refracting power and having a meniscus shape in which a convex surface is directed toward the object side;

a third lens having a positive refracting power and having a bi-convex shape;

an aperture stop;

a fourth lens having a positive refracting power and having a bi-convex shape;

a fifth lens having a negative refracting power and having a bi-concave shape; and a sixth lens having a positive refracting power and having a bi-convex shape, the first lens, the second lens, the third lens, the aperture stop, the fourth lens, the fifth lens, and the sixth lens being arranged in order from the object side to an image surface side, the imaging lens being constituted by six groups and six sheets of independent lenses as a whole, a total angle of view being set to 150 degrees or more, a following conditional expression (1) being fulfilled:

$$(1) \; 40 < R5/f$$

where

R5 is a radius of curvature on an optical axis of a surface on the object side of the third lens and f is a focal length of an entire system.

7. The imaging apparatus according to claim 6, wherein a following conditional expression (2) is fulfilled:

$$(2) \; 1.5 < f6/f < 2.05$$

where f6 is a focal length of the sixth lens.

8. The imaging apparatus according to claim 6, wherein a following conditional expression (3) is fulfilled:

$$(3) \; -0.6 < R4/f2 < 0.52$$

where

R4 is a radius of curvature on an optical axis of a surface on an image side of the second lens and f2 is a focal length of the second lens.

9. The imaging apparatus according to claim 6, wherein a following conditional expression (4) is fulfilled:

$$(4) \; -5.5 < f123/f456 < -1.35$$

where f123 is a synthetic focal length of the first lens, the second lens, and the third lens and f456 is a synthetic focal length of the fourth lens, the fifth lens, and the sixth lens.

10. The imaging apparatus according to claim 6, wherein a following conditional expression (5) is fulfilled:

$$(5) \; 1 < (R3+R4)/(R3-R4) < 1.067$$

where

R3 is a radius of curvature on an optical axis of a surface on the object side of the second lens and R4 is a radius of curvature on an optical axis of a surface on the image side of the second lens.

* * * * *